United States Patent [19]
Matsuhashi et al.

[11] Patent Number: 5,957,522
[45] Date of Patent: Sep. 28, 1999

[54] CARGO BLOCKING DEVICE FOR VEHICLE

[75] Inventors: Kazuhiro Matsuhashi; Tetsuhiro Iwaki; Junsuke Inoue, all of Hiroshima, Japan

[73] Assignee: Mazda Motor Corporation, Hiroshima, Japan

[21] Appl. No.: 08/721,635

[22] Filed: Sep. 26, 1996

[30] Foreign Application Priority Data

| Sep. 26, 1995 | [JP] | Japan | 7-273608 |
| Mar. 31, 1996 | [JP] | Japan | 8-101878 |
| Sep. 4, 1996 | [JP] | Japan | 8-234113 |

[51] Int. Cl.⁶ ..................... B60N 3/04
[52] U.S. Cl. ............ 296/66; 296/68.1; 296/65.09; 296/65.16
[58] Field of Search ............ 296/65.1, 66, 68.1

[56] References Cited

U.S. PATENT DOCUMENTS

| 1,634,715 | 9/1927 | Kleinsmith | 296/65.1 |
| 1,796,081 | 3/1931 | Bundy | 296/66 |
| 2,152,505 | 3/1939 | Stuart et al. | 296/65.1 |
| 4,382,629 | 5/1983 | Froumajou | 296/66 |
| 4,390,205 | 6/1983 | Louis | 296/66 |
| 4,607,884 | 8/1986 | Heling | 297/341 |
| 4,634,180 | 1/1987 | Zaveri et al. | 297/341 |
| 5,044,683 | 9/1991 | Parsson | 396/65.1 |

FOREIGN PATENT DOCUMENTS

| 2-17433 | 2/1990 | Japan | 296/65.1 |
| 2-125845 | 10/1990 | Japan . | |

*Primary Examiner*—Gary C. Hoge
*Attorney, Agent, or Firm*—Smith Patent Office

[57] ABSTRACT

A cargo blocking device for a vehicle that prevents cargo from moving forward beyond a rear passenger seat in an event of a front end collision on a sudden stop of the vehicle. The cargo blocking device can include a blocking frame connected to a backrest of the rear passenger seat. The seat cushion can be hinged to move to an approximately upright vertical position and the backrest can be positioned in an approximately horizontal rest position.

2 Claims, 38 Drawing Sheets

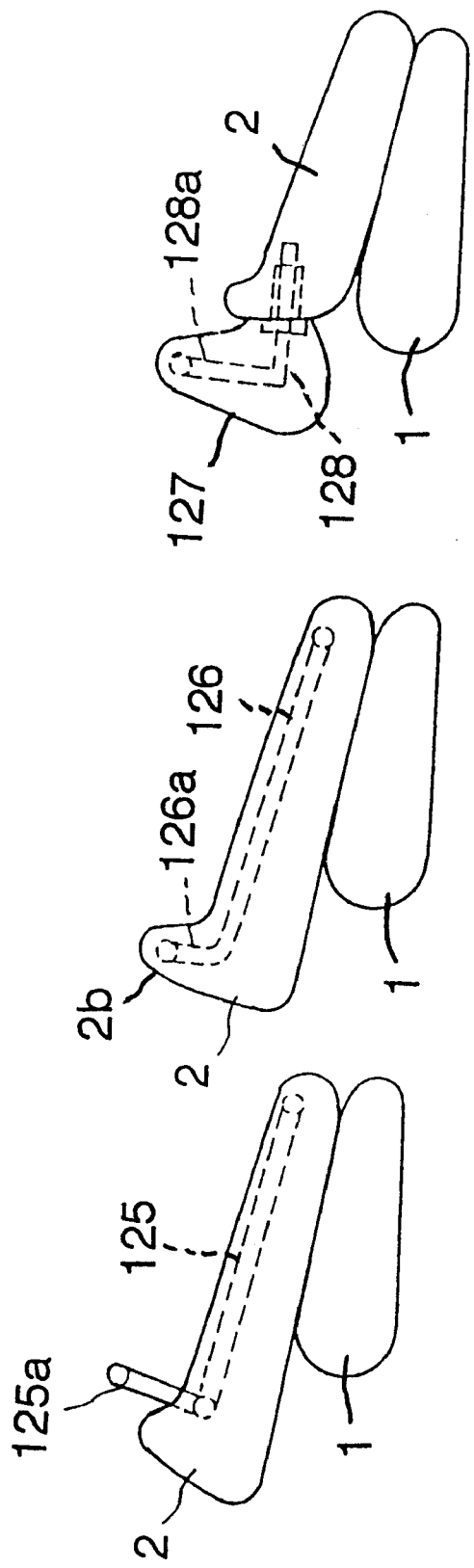

CARGO BLOCKING DEVICE FOR VEHICLE

BACKGROUND OF THE INVENTION

1. Field of the Invention

The present invention relates to a cargo blocking device installed directly to, or related to, a rear passenger seat of an automotive vehicle.

2. Description of the Related Art

Typically, double foldaway rear passenger seats comprise a seat cushion which is hinged at its front so that it may be rotated to an upright position and a backrest that is hinged at its lower end to be moved forward down to a rest position. As described in, for instance, Japanese Unexamined Utility Model Publication No. 2-17433, one of such double foldaway passenger seats can fold in two ways. That is, the backrest can be turned down over the seat cushion or turned down after the seat cushion has been rotated up.

While the double foldaway passenger seat is advantageous in that it is able to be folded in two different ways, there are apprehensions that, in the event of a collision or a sudden stop, the cargo put on the back of the backrest, that has been turned down over the seat cushion, will fly toward a front passenger compartment. In order to eliminate these concerns, the backrest is provided with a partition bar on the back thereof. Such a rear passenger seat is known from, for instance, Japanese Unexamined Utility Model Publication No. 2-125845. The partition bar is folded down against the back of the backrest when the backrest is in its upright position and is turned up to catch the cargo put on the back of the backrest when it is in the rest position. If the backrest is turned down after the seat cushion has been turned up, the seat cushion prevents the cargo put on the back of the backrest in the rest position from flying toward the front passenger compartment in the event of a collision or a sudden stop.

The partition bar such as shown in the Japanese Unexamined Utility Model Publication No. 2-125845 must be manually turned up before putting the cargo on the back of the backrest. The manual turning of the partition bar is often ignored before the cargo is put on the back of the backrest.

SUMMARY OF THE INVENTION

It is an object of the present invention to provide a cargo blocking device that prevents the cargo located on a folded rear backrest from moving forward in the event of, for instance, a collision or a sudden stop of the vehicle.

The aforesaid object of the invention is achieved by providing a cargo blocking device for a vehicle that prevents the cargo from moving forward beyond a rear passenger seat in the event of a front end collision or a sudden stop. The cargo blocking device is installed directly or indirectly to a rear passenger seat having a foldaway backrest. A seat cushion of the rear seat may be folding or stationary. A foldaway seat cushion is pivotally hinged at a front end so as to turn between an approximately horizontal regular position and an upright rest position. The foldaway backrest is pivotally mounted at a lower end so as to turn between an upright regular position and an approximately horizontal rest position. Backrest restraint means restrains the backrest from being turned down to the horizontal rest position unless the seat cushion is turned up to the upright rest position and allows the backrest to be turned down to the horizontal rest position after the seat cushion has been turned up to the upright rest position. The seat cushion in the upright rest position stops cargo from moving over the backrest in the horizontal rest position in the event of, for instance, a front end collision or a sudden stop.

The backrest restraint means may comprise a hook member secured to the backrest, and a latch member pivotally mounted to a stationary section of a vehicle body. The latch member is brought into engagement with the hook member by the seat cushion while the seat cushion is turned down to the horizontal regular position after the backrest has been turned up to the upright regular position hereby restraining the backrest from being turned down to the horizontal rest position. The latch member is disengaged from the hook member when the seat cushion is turned up to the upright rest position to permit the backrest to be turned down to the horizontal rest position.

The backrest restraint means can include a return spring mounted between the stationary section and the latch member to urge the latch member to disengage from the hook member. The latch member may be formed with an extension lever through which the latch member is operationally connected to the seat cushion such that the seat cushion pushes down and turns the extension lever against the return spring to bring the latch member into engagement with the hook member when the seat cushion is turned down toward the horizontal regular position.

Alternatively, the latch member may be operationally connected to a front end of the seat cushion by means of a cable such that the seat cushion pulls and turns the latch member against the return spring to disengage the latch member from the hook member when the seat cushion is turned up toward the upright rest position.

According to another embodiment of the invention, a cargo blocking device can comprise a cargo blocking means installed behind a folding backrest which is capable of moving between a blocking position in which the blocking means catches cargo moving forward when the backrest is in the horizontal rest position and a rest position in which the blocking means lies on the back of the backrest when the backrest is in the upright regular position. The cargo blocking means can include a link means for moving the blocking means to the blocking position following movement of the backrest toward the horizontal rest position and moving back the blocking means to the rest position following movement of the backrest toward the upright regular position. The blocking means may comprise a generally U-shaped frame pivotally mounted at pivot points near the distal ends of the post sections to the back of the backrest so as to turn up and down between the blocking and rest positions. The link means includes an nonexpandable member secured at one end to an end of one of the vertical post sections remote from the crossbar section and at another end to the stationary section of the vehicle. The link means has a length between the secured ends different from a distance between the pivot point of the post section and the pivot point of the backrest.

According to still another embodiment of the invention, the cargo blocking device comprises a blocking means installed behind the backrest and capable of moving between an blocking position in which the blocking means catches cargo moving forward while the backrest is in the horizontal rest position and a rest position in which the blocking means lies on the back of the backrest while the backrest is in the upright regular position. The blocking device can include a cargo detection means, such as a pressure detecting means, for detecting cargo placed on the back of the backrest in the rest position, and activation means responsive to detection of the cargo by the cargo detection means for moving the blocking means to the blocking position. The blocking means may also be pivotally mounted to the back of the backrest, to the ceiling of the vehicle behind the backrest or to the floor of the vehicle behind the backrest, so as to allow the blocking means to turn to the blocking position.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote the same or similar parts or elements, and in which:

FIG. 34A is a schematic illustration showing a cargo blocking device installed to a rear passenger seat in accordance with another embodiment of the invention;

FIG. 34B is schematic illustration showing a variation of the cargo blocking device shown in FIG. 34A;

FIG. 34C is schematic illustration showing another variation of the cargo blocking device shown in FIG. 34A;

DETAILED DESCRIPTION OF THE PREFERRED EMBODIMENTS

Figure 1:
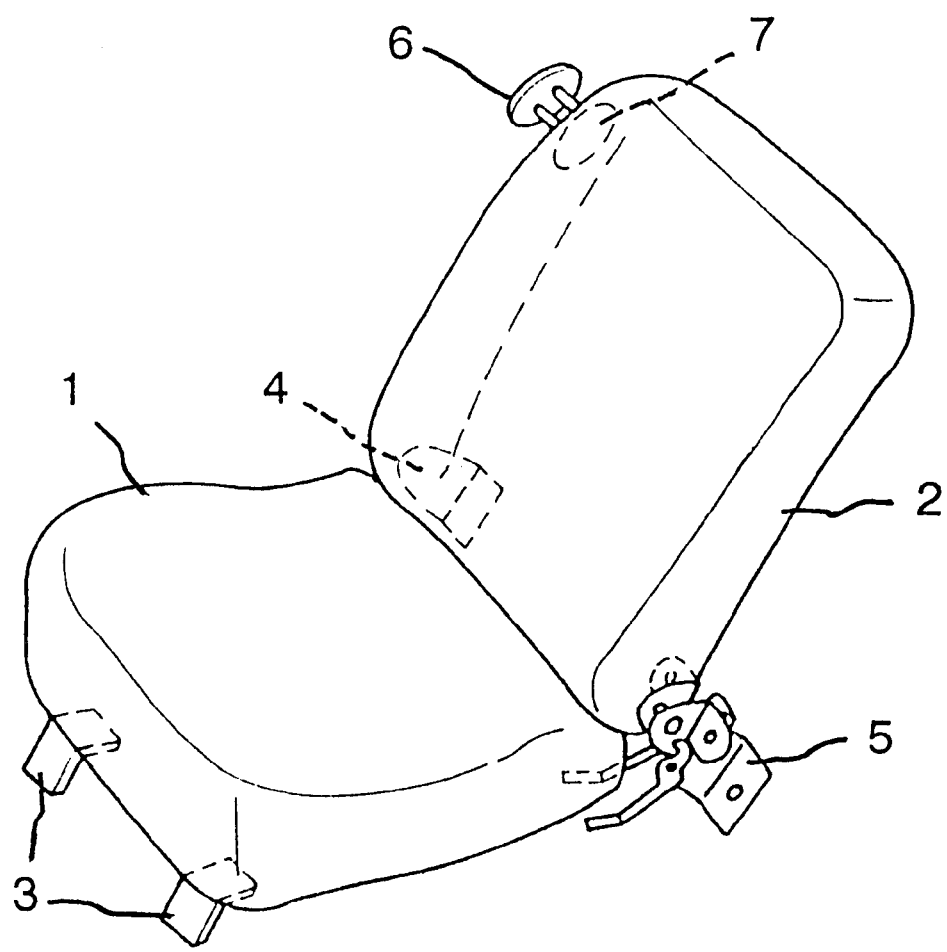
FIG. 1 is a perspective view of a cargo blocking device connected to a rear passenger seat of a vehicle in accordance with an embodiment of the invention.
Figure 2:
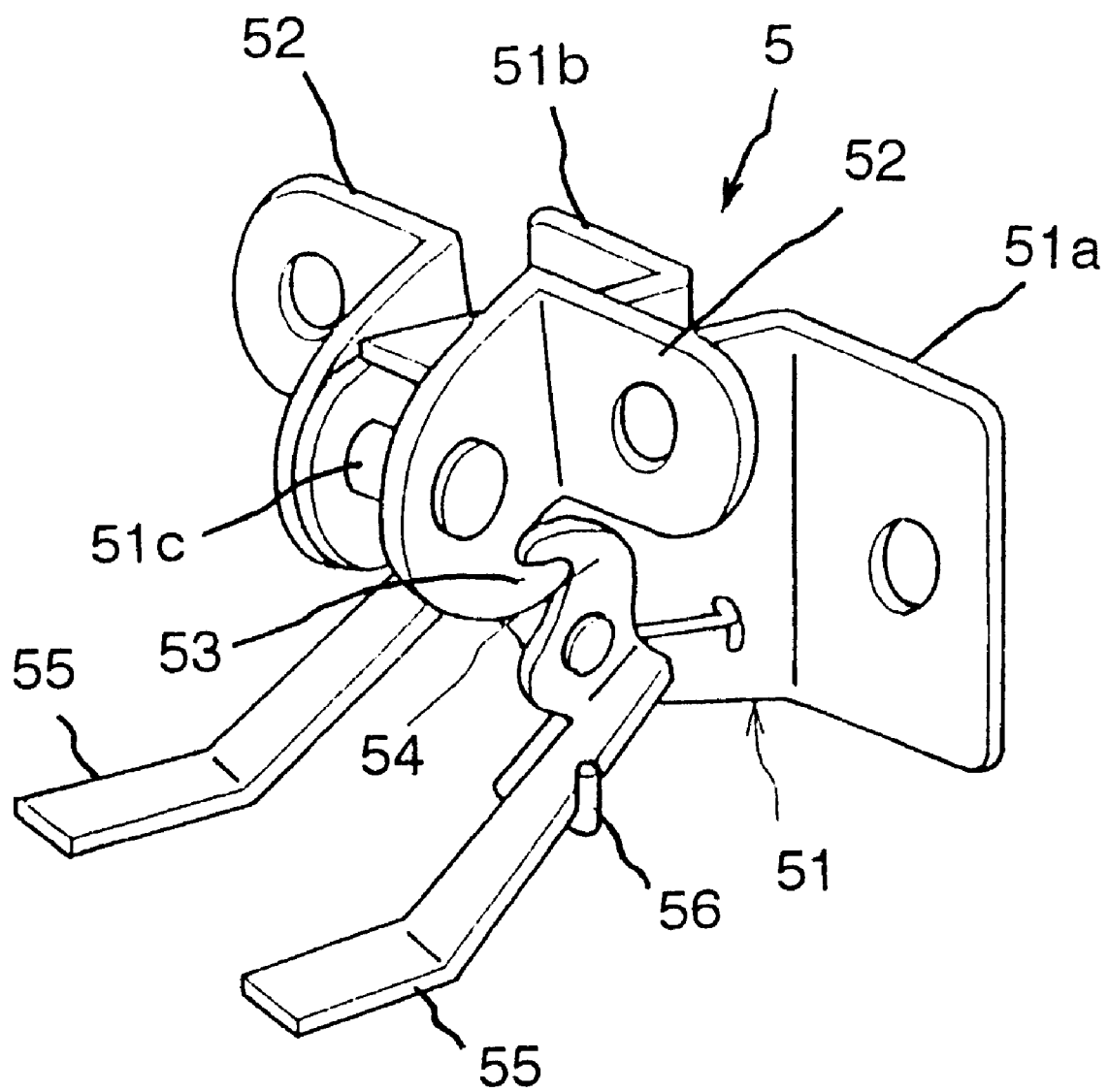
FIG. 2 is a perspective view of a side hinge of a rear seat.

Referring to the drawings in detail, in particular, to FIGS. 1 to 5 showing a cargo blocking device connected to a rear passenger seat in accordance with a first embodiment of the invention, the rear seat is a double folding type comprising a seat cushion 1 and a padded foldaway backrest 2. The seat cushion 1 is supported by means of a pair of hinges 3 secured to the front end of the seat cushion 1 for pivotal movement to an upright rest position from an approximately horizontal position. The backrest 2 is supported by means of side hinges 4 and 5 secured to both lower sides of the foldaway backrest 2 for pivotal movement to an approximately horizontal rest position from an upright regular position. A seat lock comprises a striker 6 secured to a side wall of a vehicle body B (only schematically illustrated in FIGS. 5A to 5C) and a catcher 7 secured to the foldaway backrest 2 which are engageable with each other to fix the foldaway backrest 2 in the upright regular position.

One of the side hinges 4 and 5, adjacent to another rear passenger seat (not shown), namely the side hinge 5, is of a type functioning to couple the seat cushion 1 and foldaway backrest 2 together so as to 1) prevent movement of the foldaway backrest 2 toward the rest position when the seat cushion 1 is in the horizontal position and 2) uncouple the seat cushion 1 and foldaway backrest 2 from each other so as to permit movement of the foldaway backrest 2 to the rest position when the seat cushion 1 is in the horizontal position. As shown in detail in FIG. 2, the side hinge 5 includes a hinge structure 51 comprising left and right L-shaped brackets 51a and 51b through which the side hinge 5 is secured to the floor of the vehicle body B, a pivot pin 51c extending through both L-shaped brackets 51a and 51b, and a pair of rotatable hook plates 52 fitted for rotation on opposite ends of the hinge pin 51c. One of the hook plates 52 is secured to one of the two foldaway backrests 2 placed side by side and the other is secured to the other foldaway backrest 2.

Each hook plate 52 is formed with a hook notch 53 capable of being engaged by a lock arm 54 mounted for rotation on the L-shaped bracket 51a, 51b. The lock arm 54 is integrally formed with a rigid arm extension 55 bent at an appropriate angle so that the lower end section of the arm extension 55 is located under the seat cushion 1 when it is placed in the horizontal rest position and pushed down by the seat cushion 1. A return spring 56 is mounted between the arm extension 55 and the L-shaped bracket 51a, 51b to force the lock arm 54 to be disengaged from the hook notch 53 of the hook plate 52.

Figure 3:
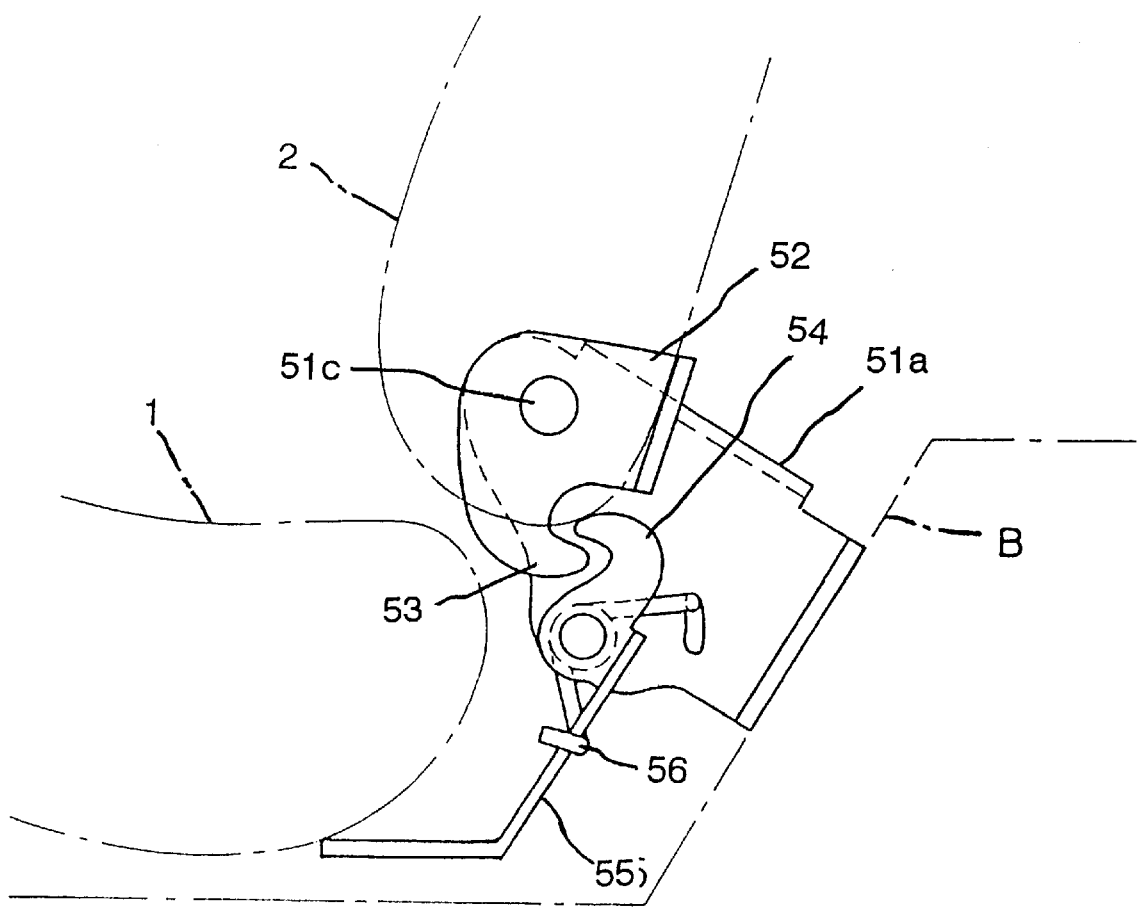
FIG. 3 is an explanatory illustration showing the side hinge in a locked position.
Figure 4:
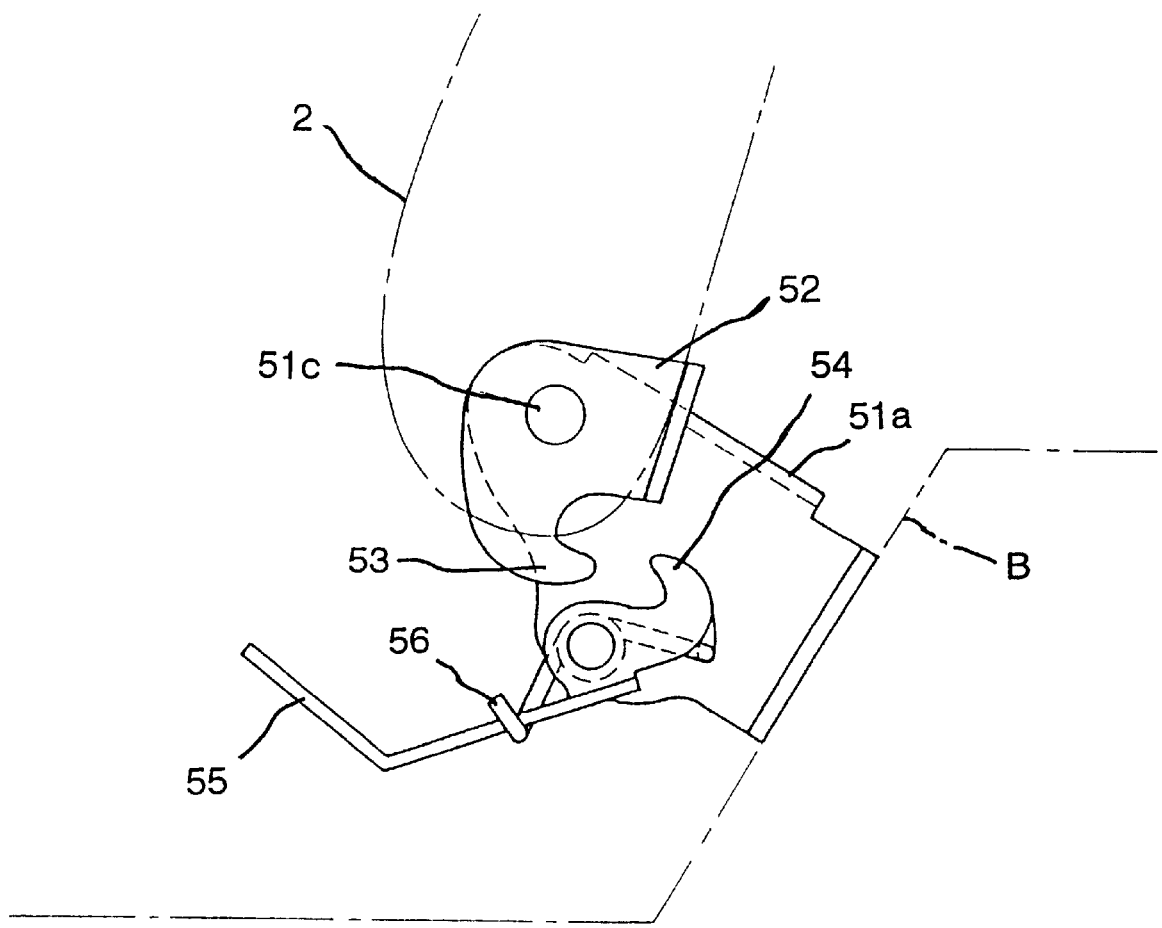
FIG. 4 is an explanatory illustration showing the side hinge in an unlocked position.
Figure 5A:
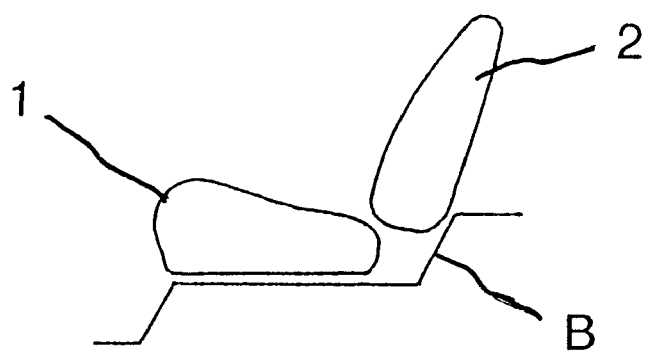
FIGS. 5A to 5C are explanatory illustrations showing the folding operations of the rear passenger seat.
Figure 5B:
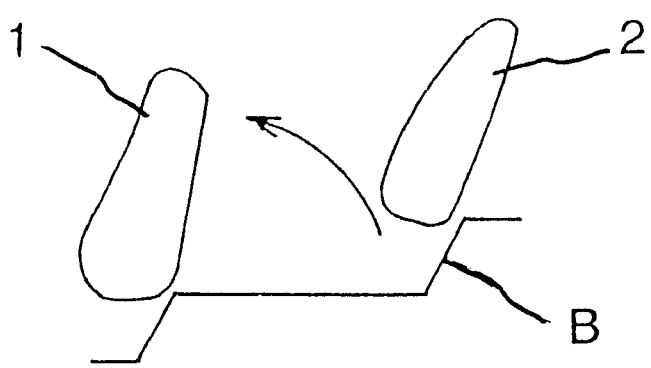

As long as the seat cushion 1 remains in the horizontal position as shown in FIG. 5A, the arm extension 55 of the lock arm 54 is pushed down by the seat cushion 1 against the return spring 56 and forces the lock arm 54 to become engaged with the hook plate 52 as shown in FIG. 3. As a result, the lock arm 54 is brought into engagement with the hook plate 52, holding the side hinge 5 locked. In this position, the foldaway backrest 2 can not be turned down by means of the engagement between the hook plate 52 and the lock arm 54. When the seat cushion 1 is turned upward to the upright position as shown in FIG. 5B, the seat cushion 1 releases the arm extension 55, permitting the lock arm 54 to turn in a clockwise direction under the influence of the return spring 56 as shown in FIG. 4. As a result, the lock arm 54 is disengaged from the hook plate 52, unlocking the side hinge 5 and permitting the foldaway backrest 2 to turn downward as shown in FIG. 5C.

Figure 5C:
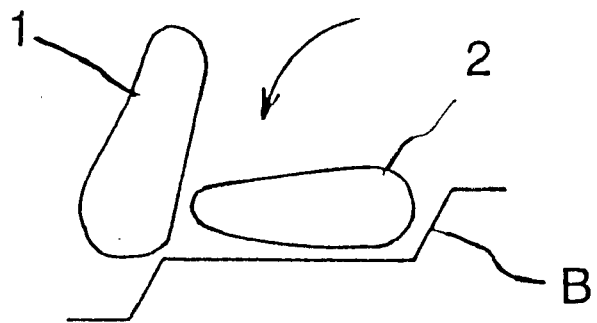

As illustrated in FIGS. 5A through 5C, because the foldaway backrest 2 is permitted to move only when the seat cushion 1 has been turned up at an approximately right angle, the seat cushion 1 in the upright rest position functions as a protection wall which prevents cargo located on the folded backrest 2 from plunging toward the front passenger compartment beyond the rear seat in the event of, for instance, a collision or a sudden stop of the vehicle.

Figure 6:
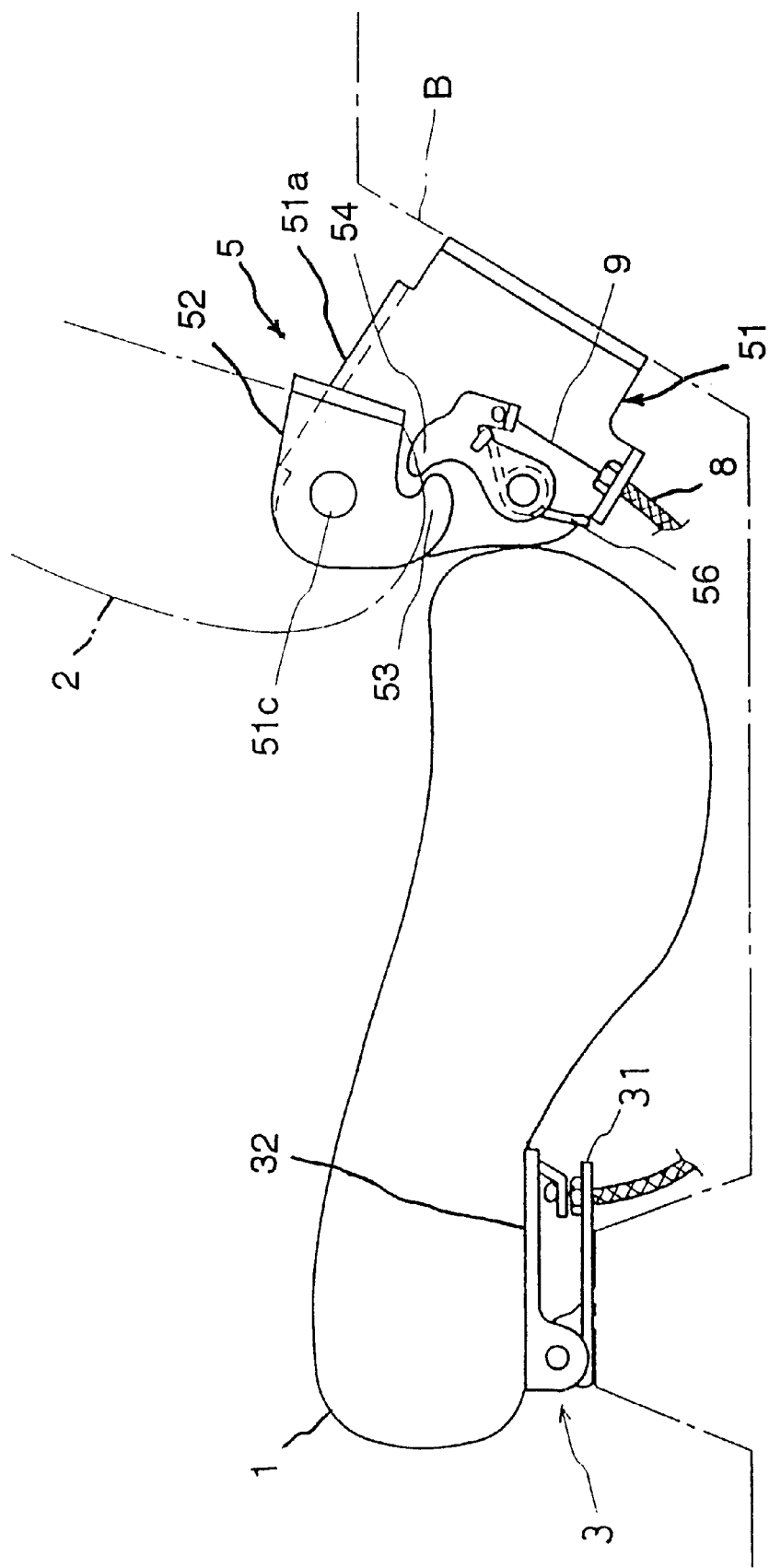
FIG. 6 is an explanatory illustration showing a side hinge in a locked position of a cargo blocking device in accordance with another embodiment of the invention.
Figure 7:
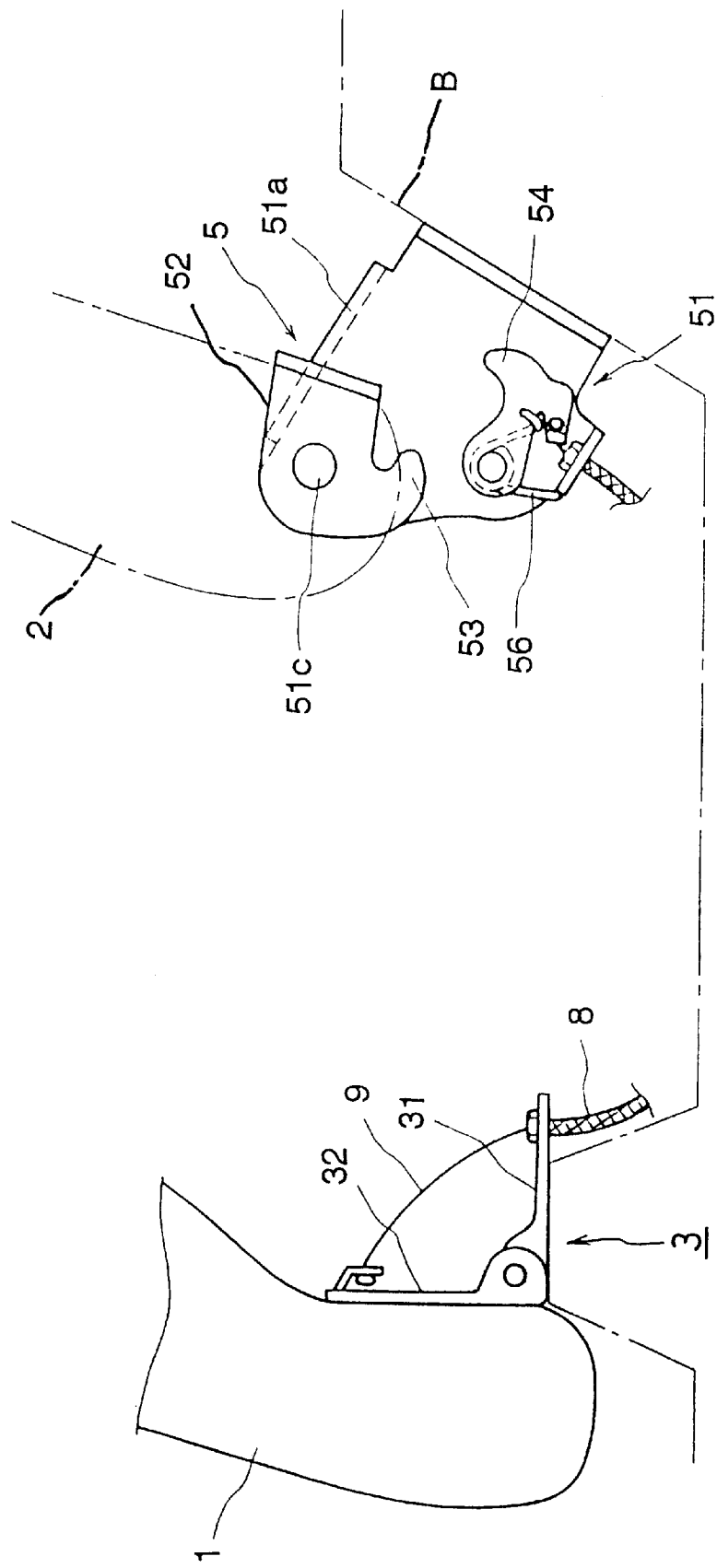
FIG. 7 is an explanatory illustration showing the side hinge in an unlocked position.

FIGS. 6 and 7 show a cargo blocking device connected to a double folding type of rear passenger seat in accordance with another embodiment of the invention. The rear seat comprises a seat cushion 1 and a padded foldaway backrest 2. The seat cushion 1 is supported by means of a pair of front hinges 3 secured to the front end of the seat cushion 1 for pivotal movement between an upright rest position and an approximately horizontal regular position. The foldaway backrest 2 is supported by means of side hinges 5 (only one of which is shown) secured to both lower sides of the foldaway backrest 2 for pivotal movement between a folded rest position and an approximately upright regular position.

The front hinge 3 comprises a bracket 31 secured to a floor of the vehicle body B and a hinge leaf 32 pivotally mounted on the bracket 31 and secured to the seat cushion 1.

One of the side hinges 5 secured to a lower side of the foldaway backrest 2 adjacent to another rear passenger seat (not shown) is of a type linked to the front hinge 3. This side hinge 5 functions, on one hand, to prevent movement of the foldaway backrest 2 toward the rest position when the seat cushion 1 is in the horizontal regular position and, on the other hand, to permit movement of the foldaway backrest 2 to the folded rest position when the seat cushion 1 is in the upright rest position.

The side hinge 5 includes a hinge structure 51 comprising left and right L-shaped brackets (only 51a shown) through which the side hinge 5 is secured to the floor of the vehicle body B, a pivot pin 51c extending through both L-shaped brackets, and a pair of rotatable hook plates 52 mounted for rotation on opposite ends of the hinge pin 51c. Each hook plate 52 is formed with a hook notch 53 capable of being engaged by a lock arm 54 mounted for rotation on the L-shaped brackets. The lock arm 54 and hinge leaf 32 are interconnected by means of a flexible, but non-expandable cable 9 received in a flexible protection tube 8. This flexible wire 9 is connected at one end to the hinge leaf 32 and at another end to the lock arm 54, and the protection tube 8 is secured at one end to the bracket 31 of the front hinge 3 and at another end to the bracket 51a of the side hinge 5. A return spring 56 is mounted between the arm extension 55 and the L-shaped brackets to release the lock arm 54 from the hook plate 52.

As long as the seat cushion 1 remains in the regular horizontal position as shown in FIG. 6, the lock arm 54 is forced by the return spring 56 to keep engagement with the hook plate 52, preventing the foldaway backrest 2 from turning down. On the other hand, when the seat cushion 1 is turned up to the rest position as shown in FIG. 7, the seat cushion 1 pulls the flexible cable 9 to force the lock arm 54 to disengage from the hook plate 52, permitting the foldaway backrest to fold down.

The side hinge 5, on one hand, prevents the foldaway backrest 2 from being folded as long as the seat cushion 1 is in the regular horizontal position and, on the other hand, permits the foldaway backrest 2 to be folded only when the seat cushion 1 has been turned up to the vertical rest position. Consequently, the seat cushion 1 in the rest position functions as a blocking wall which blocks cargo put on the folded backrest 2 from plunging toward the front passenger compartment in the event of, for instance, a collision or a sudden stop of the vehicle.

Figure 8:
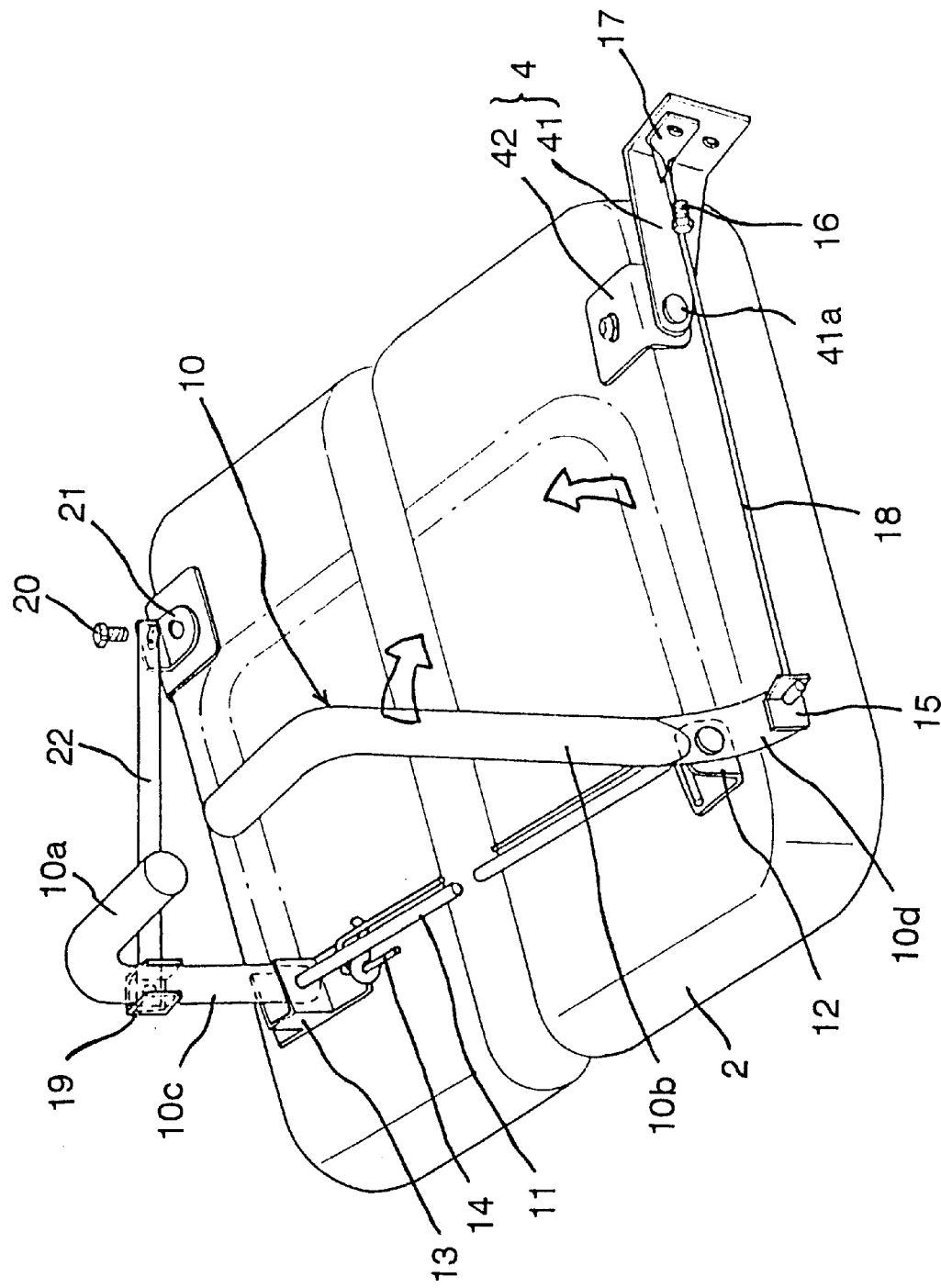
FIG. 8 is a perspective view of a cargo blocking device connected to a rear passenger seat in accordance with another embodiment of the invention.
Figure 9A:
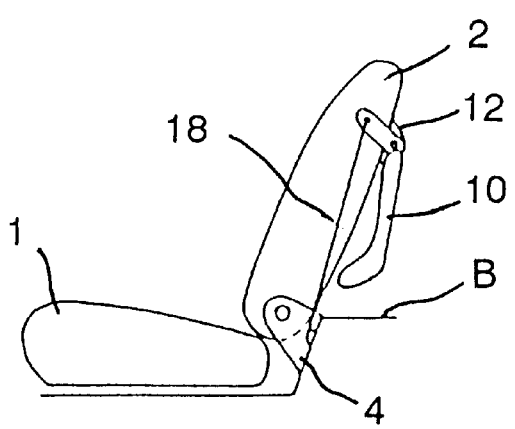
FIG. 9A is a side view of a cargo blocking device connected to a rear passenger seat in a turned down position.
Figure 9B:
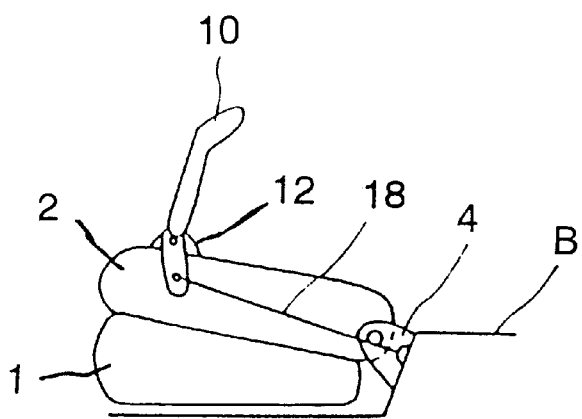
FIG. 9B is a side view of the cargo blocking device in a turned up blocking position.
Figure 10:
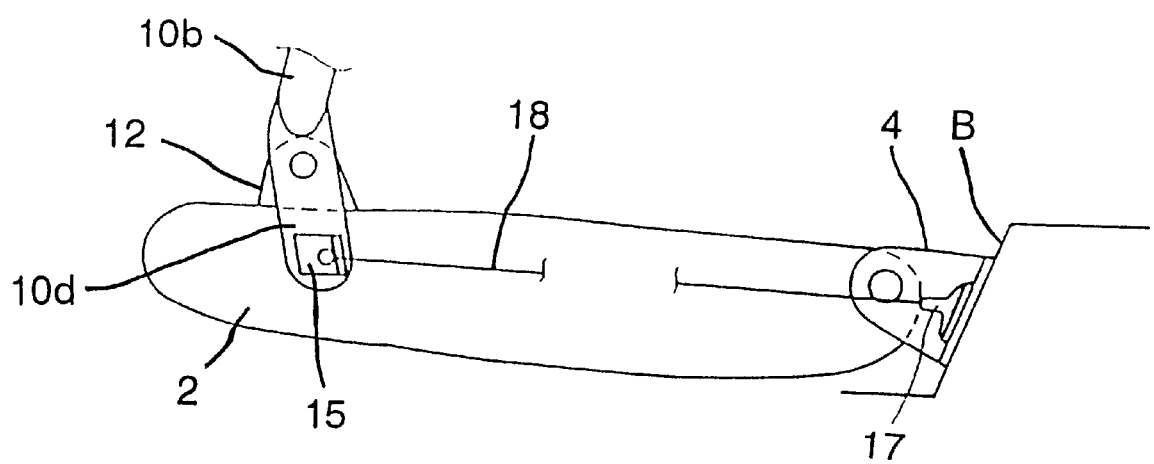
FIG. 10 is an explanatory illustration showing a raising mechanism for a cargo blocking frame of the cargo blocking device shown in FIG. 8.

FIGS. 8 through 10 show a cargo blocking device connected to a double folding type of rear passenger seat in accordance with another embodiment of the invention. This double folding type of rear passenger seat can be folded in two ways.

The rear seat comprises a seat cushion 1 and a foldaway backrest 2. The foldaway backrest 2 is supported by means of a side hinge 4 secured to a lower side of the foldaway backrest 2 for pivotal movement to an approximately horizontal rest position from an upright regular position. The side hinge 4 comprises a stationary bracket 41 secured to the floor of a vehicle body B and a hinge leaf 42 secured to the foldaway backrest 2 and supported for pivotal movement by the bracket 41 through a pivot pin 41a.

The foldaway backrest 2 is provided with a generally U-shaped cargo blocking frame 10, having a crossbar section 10a and post sections 10b and 10c extending from opposite ends of the crossbar section 10a, mounted on the back thereof. This cargo blocking frame 10 is secured at the lower ends of the post sections 10b and 10c to a shaft 11 supported for rotation by brackets 12 and 13. A torsion rod 14 is mounted between the shaft 11 and the brackets 12 so as to urge the cargo blocking frame 10 toward the back of the foldaway backrest 2 while the foldaway backrest 2 is in the upright regular position. One post section 10b of the cargo blocking frame 10 is integrally formed with a lower extension 10d extending laterally away from the bracket 12 and upward from the shaft 11 as viewed when the cargo blocking frame 10 is in the rest position shown by a chained line in FIG. 8. A non-expandable cable 18 is stretched between an attachment 15 welded, or otherwise secured, to the lower extension 10d of the post section 10b and an attachment 17 secured to the stationary bracket 41 of the side hinge 41 by a fastening bolt 16. The attachment 17 is located on the bracket 41 at a point opposite the attachment 15 at the lower extension 10d of the post section 10b with respect to the pivot pin 41a. Because the cable 18 does not change its length, the cargo blocking frame 10 is forcibly turned against the torsion bar 14 by the cable 18 to its upright position as shown by a solid line in FIG. 8 when the foldaway backrest 2 is turned down from the upright regular position. On the other hand, the cargo blocking frame 10 is returned by the torsion bar 14 and the cable 18 to the rest position and held in that position by the torsion bar 14.

The cargo blocking frame 10 may be connected to webbing 22. This webbing 22 is connected at its one end to a bracket 21 secured to a lower end of the foldaway backrest 2 by a bolt 20 and at its another end to a bracket 19 welded, or otherwise secured, to the post section 10c of the cargo blocking frame 10.

As clearly shown in FIGS. 9A and 9B, the cargo blocking frame 10 is turned up and down between the rest position and the upright position as the foldaway backrest 2 is turned up and down between the upright regular position and horizontal rest position. As shown in FIG. 10, the seat cushion 1 may be turned up before the foldaway backrest 2 is turned down.

Figure 11A:
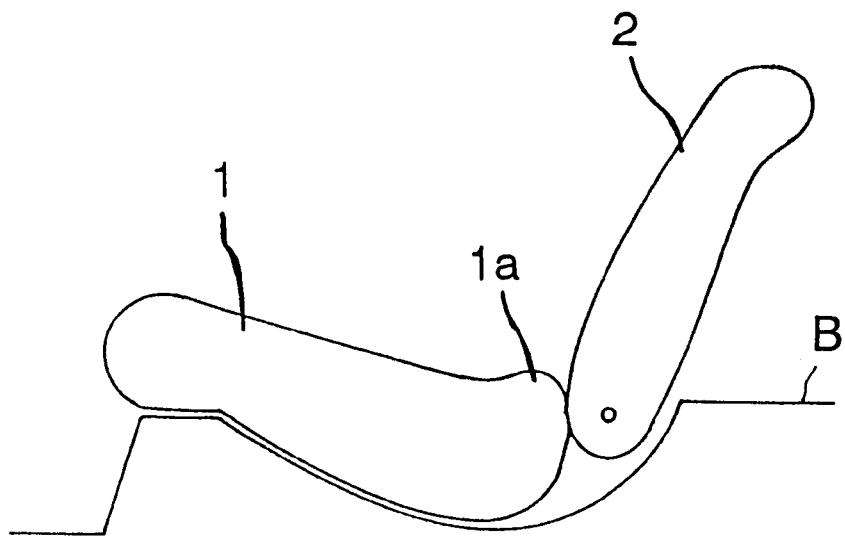
FIG. 11A is a schematic side view of a rear passenger seat as a cargo blocking device in accordance with another embodiment of the invention.

FIG. 11A shows a cargo blocking device using a foldaway rear passenger seat in accordance with another embodiment of the invention. The rear seat comprises a seat cushion 1 and a foldaway backrest 2. The seat cushion 1 has a rear end section 1a jutting rearward and upward along its full width and provides a space between the rear end section and the vehicle body B where the foldaway backrest 2 is pivotally mounted. The jutting rear end section 1a is shaped such that it does not interfere with the foldaway backrest 2 during movement of the seat cushion 1 upward from an approximately horizontal regular position nor get in the way of the foldaway backrest 2 turning toward an approximately horizontal rest position.

Figure 11B:
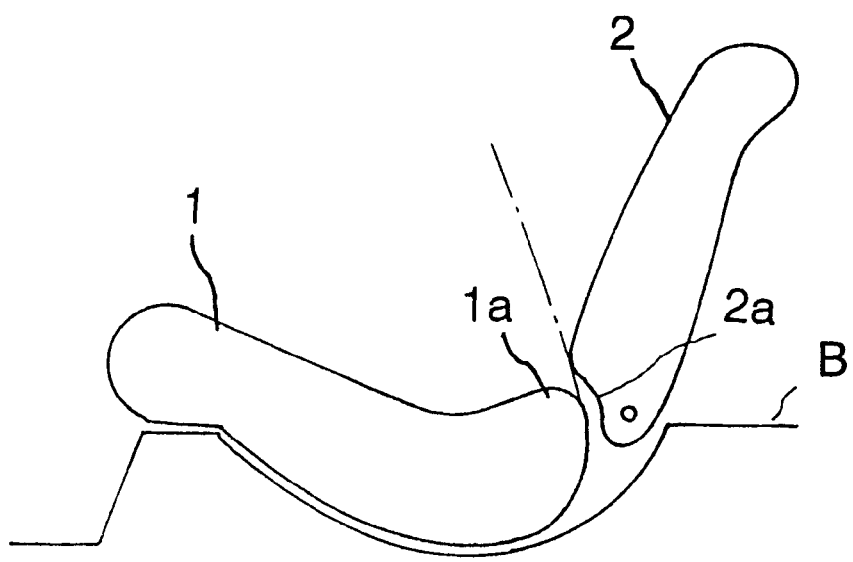
FIG. 11B is a schematic side view of a variation of the rear passenger seat shown in FIG. 11A.

Part of the rear seat where the seat cushion 1 and backrest meet together may be modified as shown in FIG. 11B. That is, the foldaway backrest 2 is formed with a depression 2a along the full width of the lower end section. This depression 2a of the foldaway backrest 2 permits the seat cushion 1 to be formed with an enlarged rear end section 1a. The seat cushion 1 and foldaway backrest 2 are arranged such that the seat cushion 1 at the jutting rear end section 1a interferes with the lower end depression 2a of the foldaway backrest 2 when both are in the regular positions but does not interfere with the lower end depression 2a of the foldaway backrest 2 after the seat cushion 1 has been turned up to the upright rest position along a path shown by a chained line in FIG. 11B. Therefore, the foldaway backrest 2 is permitted to be folded down only after the seat cushion 1 has been turned up to the upright rest position.

Figure 12:
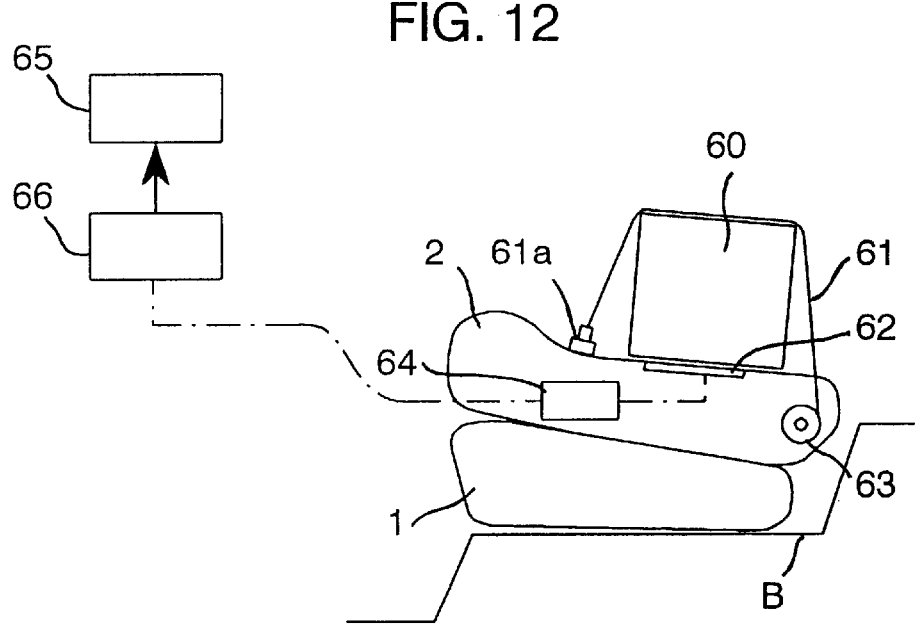
FIG. 12 is a side view of a cargo blocking device related to a rear passenger seat in accordance with another embodiment of the invention.

FIG. 12 shows a cargo blocking device incorporated into a rear passenger seat of a type responding to an ignition switch in accordance with another embodiment of the invention. This cargo blocking device is structured such that engine ignition is prohibited unless the cargo on the back of the backrest, in an approximately horizontal rest position, is tied with a cargo strap. The rear seat comprises a seat cushion 1 and a foldaway backrest 2 which is provided with a cargo strap system installed on the back thereof. The cargo strap system comprises a retractable tie strap 61 having one end capable of being connected to a locking member 61a and another end connected to the inside of a strap winder 63 of a type having a sensor for monitoring the length of the draw of tie strap 61. Connection of the tie strap 61 drawn out of the strap winder 63 to the locking member 61a is detected by means of a belt-buckle type of lock sensor 64. A cargo sensor 62, such as a pressure sensor, is embedded in the foldaway backrest 2, or alternatively secured to the back of the foldaway backrest 2, to detect that a cargo 60 is placed on the backrest 2. These sensors send signals to a control unit 66 which electrically actuates an ignition switch 65 to start an engine.

Figure 13:
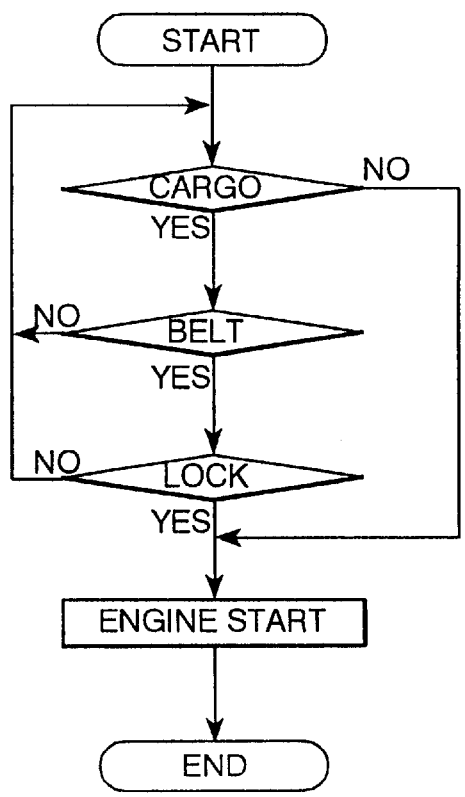
FIG. 13 is a flow chart illustrating the engine start control sequence routine related to the cargo blocking device shown in FIG. 12.
Figure 14:
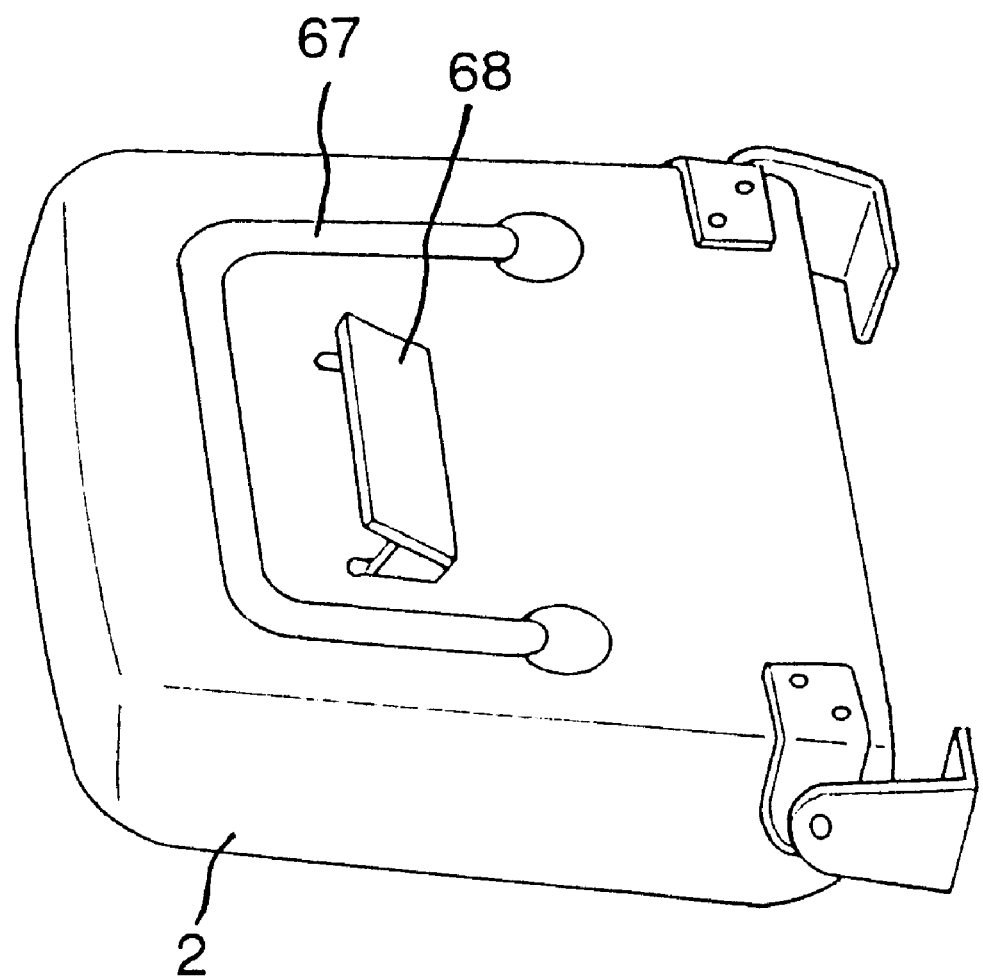
FIG. 14 is a perspective view of a cargo blocking device connected to a rear passenger seat in accordance with another embodiment of the invention.

FIG. 13 is a flow chart illustrating the ignition switch activation routine for starting an engine when a cargo 60 is tied by connecting the tie strap 61 to the locking member 61a. As shown in FIG. 13, in cases where the cargo pressure sensor 62 detects pressure greater than a specified level, the strap winder 63 detects a specified length of the tie strap 61 drawn out thereof, and the lock sensor 64 detects the connection of the tie strap 61 to the locking member 61a. The control unit 66 then receives signals from the sensors and the control unit 66 activates the ignition switch 65 to start the engine. If the cargo pressure sensor 62 does not detect a cargo or pressure greater than the specified level, the control unit 66 directly activates the ignition switch 65 to start the engine. However, even though the cargo pressure sensor 62 may detect pressure greater than the specified level, the control unit 66 does not activate the ignition switch until both the strap housing 63 and the lock sensor 64 provide signals. In this manner, in cases where the cargo 60 is placed on the collapsed foldaway backrest 2, the engine is started only when the cargo 60 is tied by the tie strap 61.

FIGS. 14 through 17A and 17B show a cargo blocking device connected to a rear passenger seat which is turned up in response to placement of cargo on the back of a folded backrest in accordance with another embodiment of the invention. The rear seat comprises a seat cushion (not shown) and a foldaway backrest 2 provided with a generally U-shaped cargo blocking frame 67 which is secured at its distal ends to a shaft 74, which will be described later, and turned automatically in response to placement of cargo on the back of the foldaway backrest 2. When the cargo 60 is put over a raiser plate 68 attached to the foldaway backrest 2, the cargo blocking frame 67 is turned through a cargo blocking frame raising mechanism.

Figure 15:
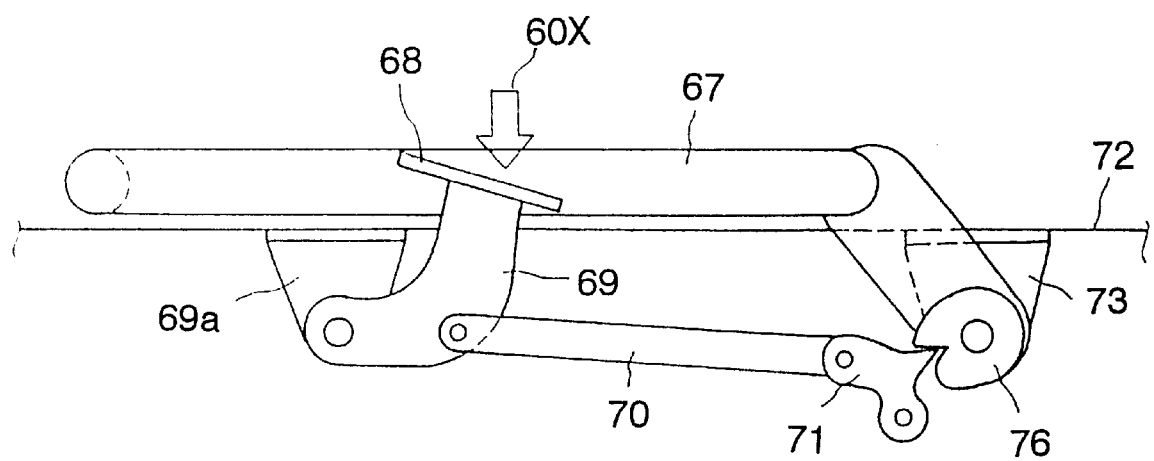
FIG. 15 is an explanatory illustration showing a raising mechanism for a cargo blocking frame of the cargo blocking device shown in FIG. 14.
Figure 16:
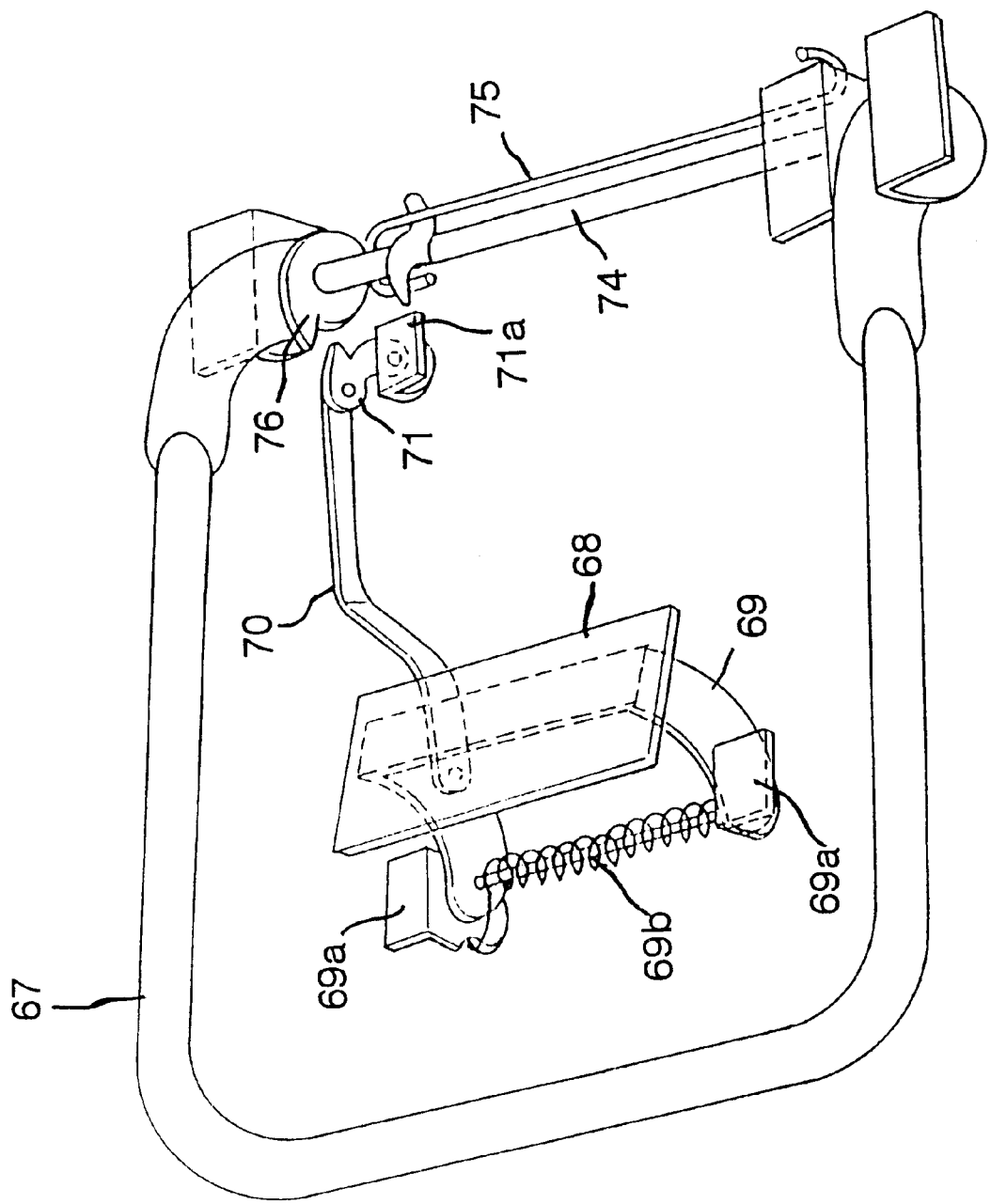
FIG. 16 is an explanatory illustration showing the major part of the cargo blocking device shown in FIG. 14.

As shown in detail in FIGS. 15 and 16, the cargo blocking frame raising mechanism includes the shaft 74 to which the cargo blocking frame is secured, and the raiser plate 68. The shaft 74 is supported for rotation by brackets 73 secured to a backing plate 72 of the foldaway backrest 2. A generally U-shaped raiser arm 69 to which the raiser plate 68 is secured is pivotally supported by brackets 69a secured to the backing plate 72. The cargo blocking frame raising mechanism further includes a hook plate 76 secured to one end of the shaft 74 and a latch arm 71 pivotally supported by a bracket 71a. The raiser arm 69 and latch arm 71 are interconnected by means of a connecting rod 70. A torsion spring 69b is mounted between the raiser arm 69 and the brackets 69a to force the raiser plate 68 to be pushed up away from the foldaway backrest 2. A torsion bar 75 is mounted between the shaft 74 and one of the brackets 73 to urge the shaft 74 in a rotational direction in which the shaft 74 turns and raises the cargo blocking frame 67. Whenever the raiser plate 68 does not have any cargo loaded thereon, the latch arm 71 and the hook plate 74 remain engaged to hold the cargo blocking frame 68 in its rest position shown in FIG. 17A.

When cargo 60 is put on the foldaway backrest 2 in the rest position, it pushes down on the raiser plate 68 in a direction indicated by an arrow 60X as shown in FIG. 15. Thus the raiser arm 69 is turned in a clockwise direction as viewed in FIG. 15 to turn the latch arm 71 in a counterclockwise direction by the connecting rod 70, thereby bringing the latch arm 71 out of engagement with the hook plate 76. As a result, the shaft 74 is set free and rotated in the clockwise direction by the torsion bar 75 to raise the cargo blocking frame 67 to a raised position as shown in FIG. 17B.

Figure 17A:
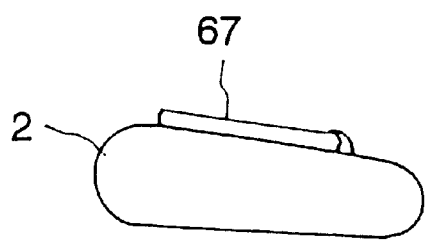
FIGS. 17A and 17B are schematic illustrations showing operation of the cargo blocking device shown in FIG. 15.
Figure 17B:
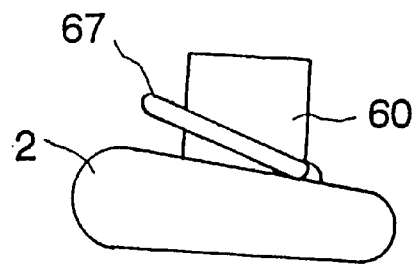

When the cargo blocking frame 67 is manually moved down against the force of torsion bar 75 after the cargo 60 has been removed, the hook plate 76 is brought into engagement with the latch arm 71, thereby holding the cargo blocking frame 67 in the folded position shown in FIG. 17A. At this time, the raiser plate 68 is pushed up away from the foldaway backrest 2 by the torsion spring 69b.

FIGS. 18 through 22 show a cargo blocking device connected to a rear passenger seat of a type having a headrest in accordance with another embodiment of the invention. As schematically shown in FIGS. 18A and 18B, a headrest 77 is supported by a generally U-shaped headrest support frame 82 pivotally mounted to the foldaway backrest 2. The headrest 77 is turned up by means of a raising mechanism in response to the placement of cargo 60 on the raiser plate on the back of a foldaway backrest 2 when it is in its rest position as shown in FIG. 18B. In this embodiment, the headrest support frame 82 works in a similar fashion to the cargo blocking frame 67 of the rear seat shown in FIGS. 14 through 17A and 17B.

As shown in detail in FIGS. 19 through 22, the rear seat comprises a seat cushion (not shown) and a foldaway backrest 2 in which the headrest raising mechanism is installed. The headrest raising mechanism includes the generally U-shaped headrest support frame 82 which has distal ends connected to each other by a hook plate 86 and a hook plate 83. The hook plate 83 is integral with, or secured to, one end of the hook plate 86. The rocker plate 86 has a shaft 88 secured thereto. This shaft 88 is pivotally supported by brackets 88a (see FIG. 22) secured to a backing plate 72 of the foldaway backrest 2. A torsion spring 89 is mounted between the shaft 88 and one of the brackets 88a to urge the shaft 88 in a rotational direction in which the headrest support frame 82 is raised up.

A generally U-shaped raiser arm 79 to which the raiser plate 78 is secured is pivotally supported by pivot pins 79a secured to the backing plate 72. The headrest raising mechanism further includes a latch arm 81 pivotally supported by a pivot pin 81a. The raiser arm 79 and latch arm 81 are linked together by means of a connecting rod 80. The raiser arm 79 is urged by a spring (not shown) to turn in a rotational direction in which the raiser plate 78 is pushed up away from the foldaway backrest 2.

In the proximity to the hook plate 86, there is provided a locking mechanism installed within the foldaway backrest 2 for locking the headrest support frame 82 in an upright position. The locking mechanism comprises a lock lever 84 supported for slide movement by a U-shaped bracket and a spring 85. The spring loaded lock lever 84 enters an opening 87 formed in the hook plate 86 when the headrest support frame 82 is brought into the upright position to prevent the headrest support frame 82 from being turned downward. When the lock lever 84 is manually forced back against the spring 85, the headrest support frame 82 is permitted to be manually turned downward.

Figure 18B:
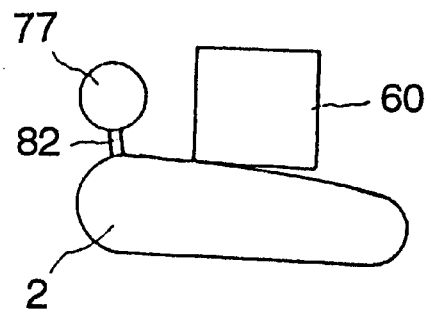
Figure 19:
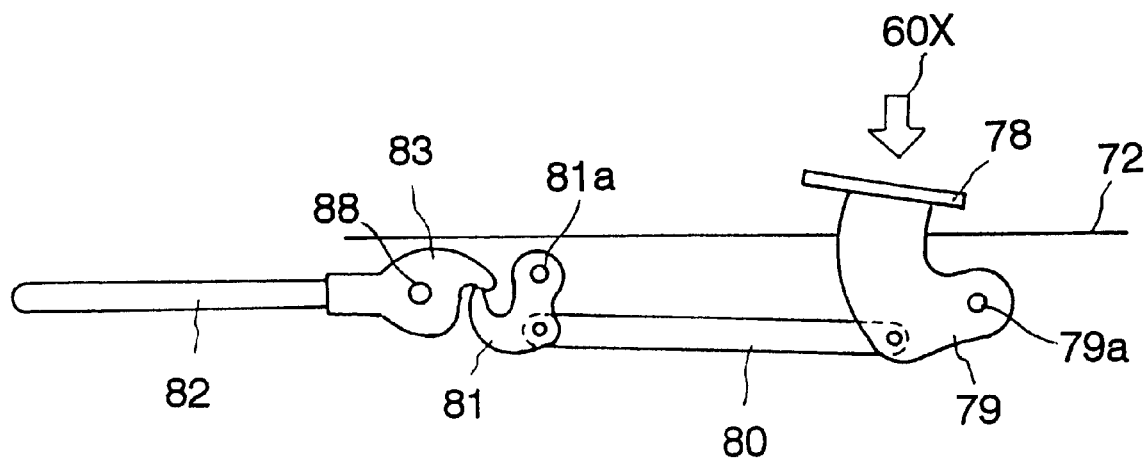
FIG. 19 is explanatory illustration showing a cargo blocking device connected to a rear passenger seat in accordance with another embodiment of the invention.
Figure 20:
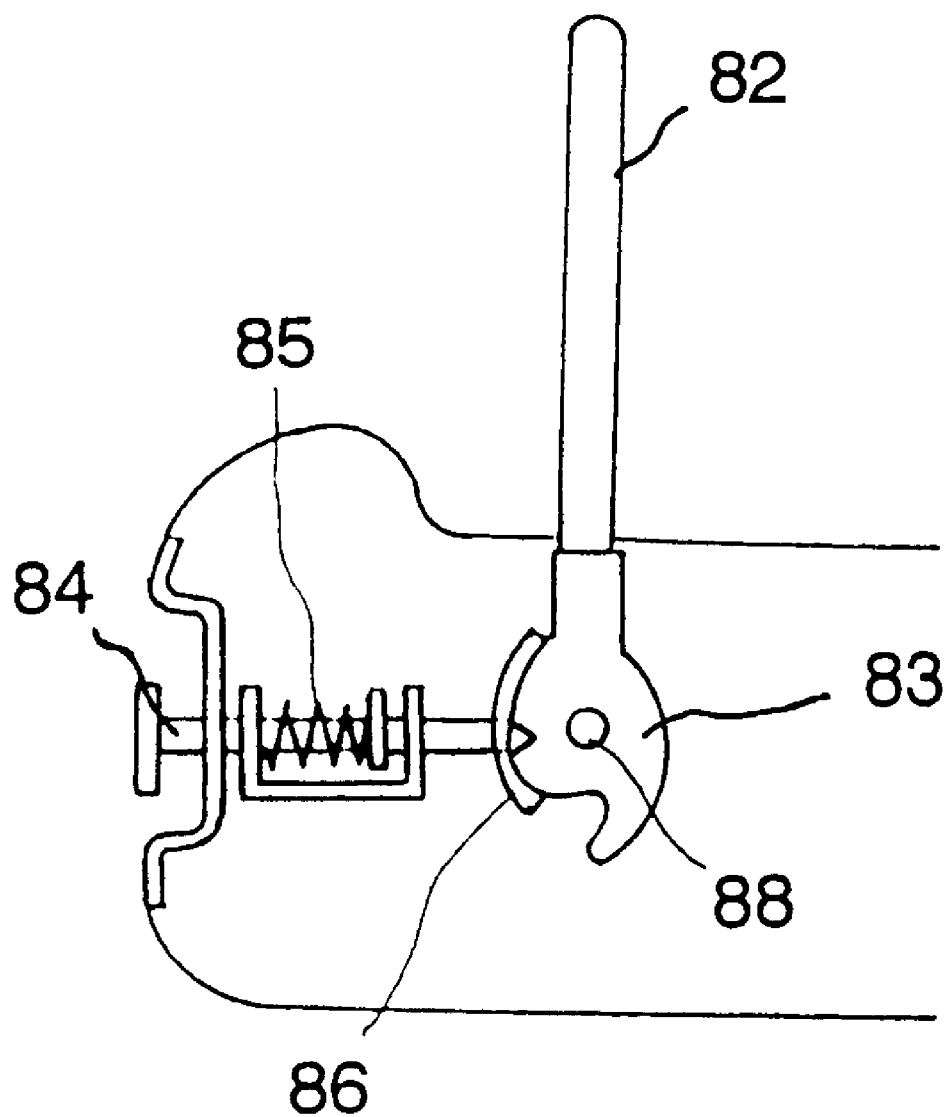
FIG. 20 is an explanatory illustration showing a raising mechanism for a cargo blocking frame of the cargo blocking device shown in FIG. 19.
Figure 21:
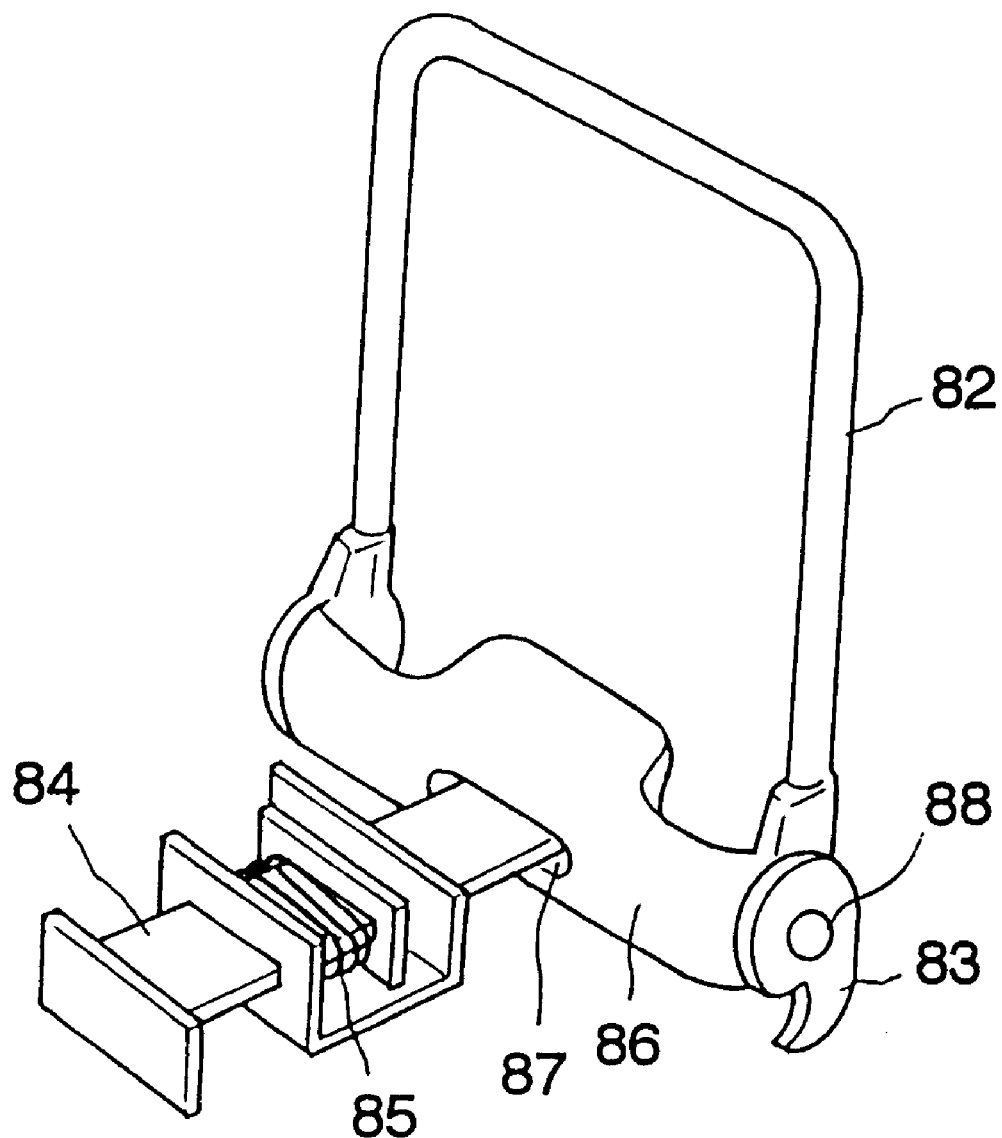
FIG. 21 is an explanatory illustration showing a locking mechanism for the cargo blocking device shown in FIG. 19.
Figure 22:
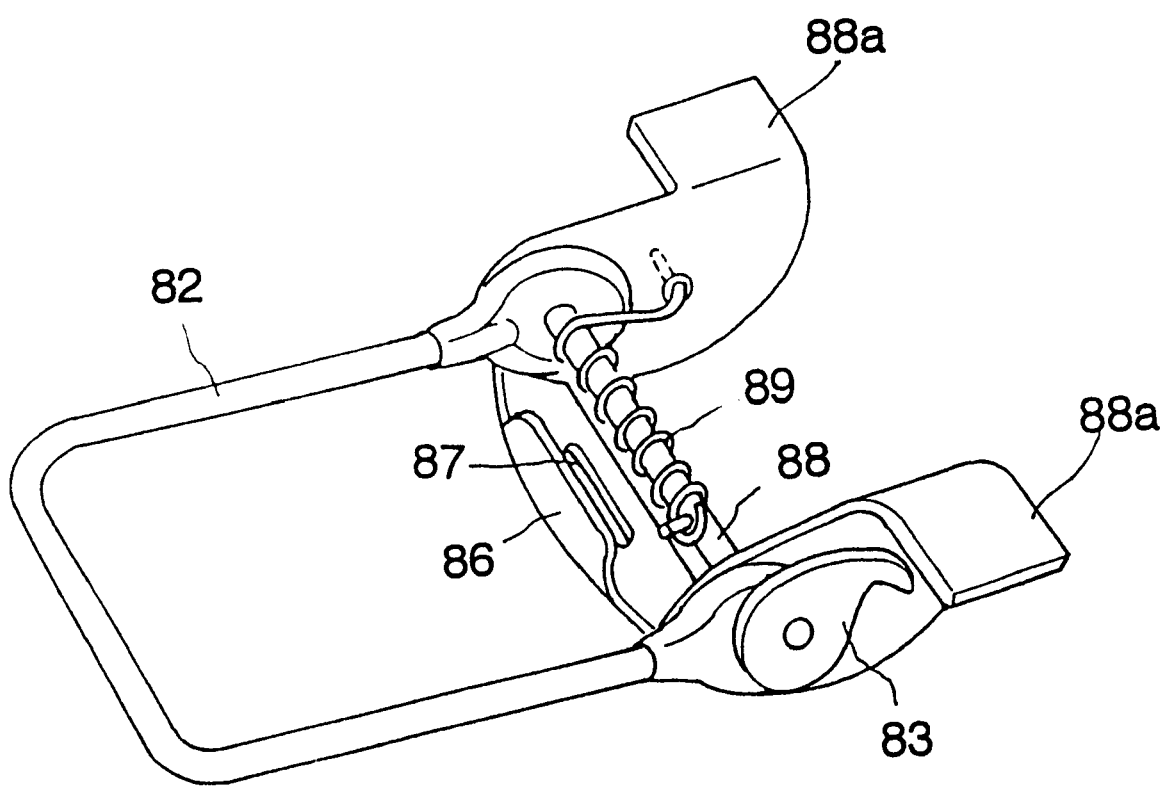
FIG. 22 is an explanatory illustration showing a cargo blocking frame and its associated mechanism of the cargo blocking device in a turned down position.

When cargo 60 is put over the raiser plate 78 on the foldaway backrest 2 in the rest position and pushes down the raiser plate 78 in a direction indicated by an arrow 60X as shown in FIG. 19, the raiser arm 79 is turned in a counterclockwise direction as viewed in FIG. 19 to turn the latch arm 81 in the counterclockwise direction through the connecting rod 80, thereby bringing the latch arm 81 out of engagement with the hook plate 83. As a result, the shaft 88 is set free and rotated in the clockwise direction by the torsion spring 89 to turn up the headrest support frame 82 to the upright position as shown in FIG. 18B. As soon as the headrest support frame 82 reaches the upright position, the lock lever 84 enters the opening 87 of the hook plate 86, preventing the headrest support frame 82 from being turned downward.

Figure 18A:
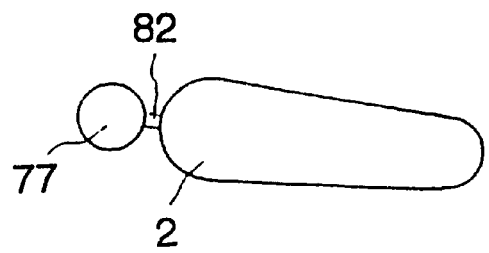
FIGS. 18A and 18B are explanatory illustrations showing a variation of the raising mechanism of FIG. 15.

When the headrest support frame 82 is manually moved down by pulling back the locker lever 84 against the spring 85 after the cargo 60 has been removed, the hook plate 83 is brought into engagement with the latch arm 81, holding the headrest support frame 82 in the collapsed position shown in FIG. 18A. In the rest position, the headrest 77 is placed above the top of the foldaway backrest 2.

Figure 23:
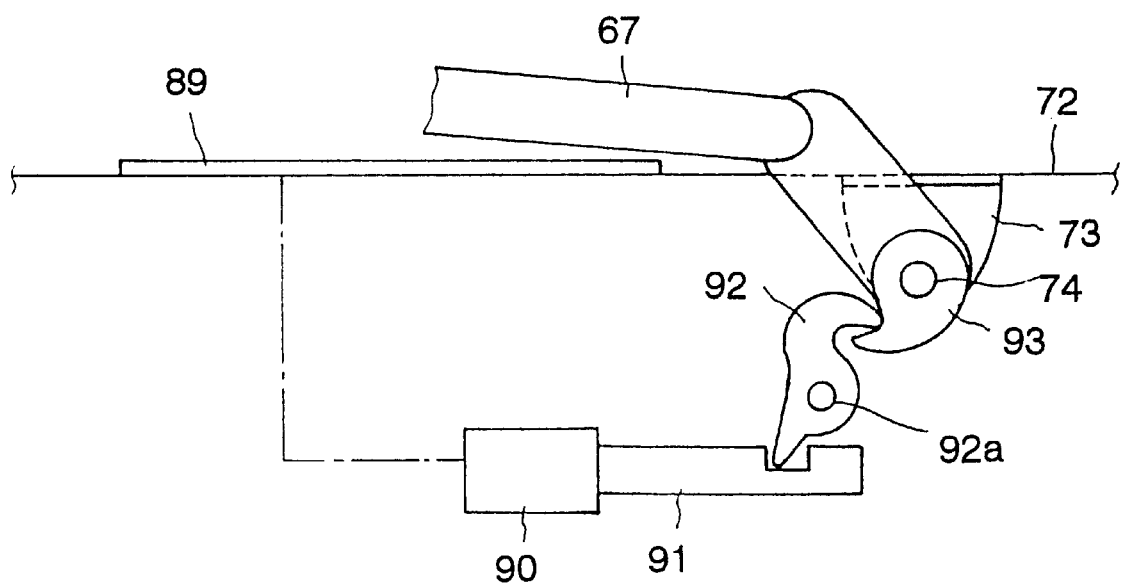
FIG. 23 is an explanatory illustration showing a cargo blocking device connected to a rear passenger seat in accordance with another embodiment of the invention.

FIG. 23 shows a cargo blocking device connected to a rear passenger seat of a type having an electrically actuated cargo blocking frame raising mechanism in accordance with another embodiment of the invention. The rear seat comprises a seat cushion (not shown) and a foldaway backrest (simply shown by a backing plate 72 of the foldaway backrest) in which the electrically activated cargo blocking frame raising mechanism is installed. The cargo blocking frame raising mechanism includes a generally U-shaped spring-loaded cargo blocking frame 67, similar to that of the rear seat shown in FIGS. 14 through 17A and 17B, which has distal ends connected to each other by a shaft 74 pivotally supported by brackets 73 secured to the backing plate 72. The shaft 74 has a hook plate 93 integral with, or secured to, one end of the shaft 74. A latch arm 92 supported by a pivot pin 92a is turned in opposite directions by means of a plunger 91 of a solenoid actuator 90. A cargo sensor plate 89, such as a pressure sensor, placed on the backing plate 72 generates an electric signal for energizing the solenoid actuator 90 when it detects pressure.

When the cargo pressure sensor plate 89 is loaded with cargo thereon and generates a signal, the solenoid actuator 90 is energized to protrude the plunger 91, turning the latch arm 92 in the counterclockwise direction to bring it out of engagement with the hook plate 93. As a result, the spring-loaded cargo blocking frame 67 turns and raises up. When the cargo is removed from the cargo pressure sensor plate 89 and the signal disappears, the solenoid actuator 90 retracts the plunger 91, bringing the latch arm 92 into the engaging position. Thereafter, when the spring-loaded cargo blocking frame 67 is manually moved down to the rest position, the hook plate 83 is brought into engagement with the latch arm 92 and thereby holds the cargo blocking frame 67 in the collapsed position.

Figure 24:
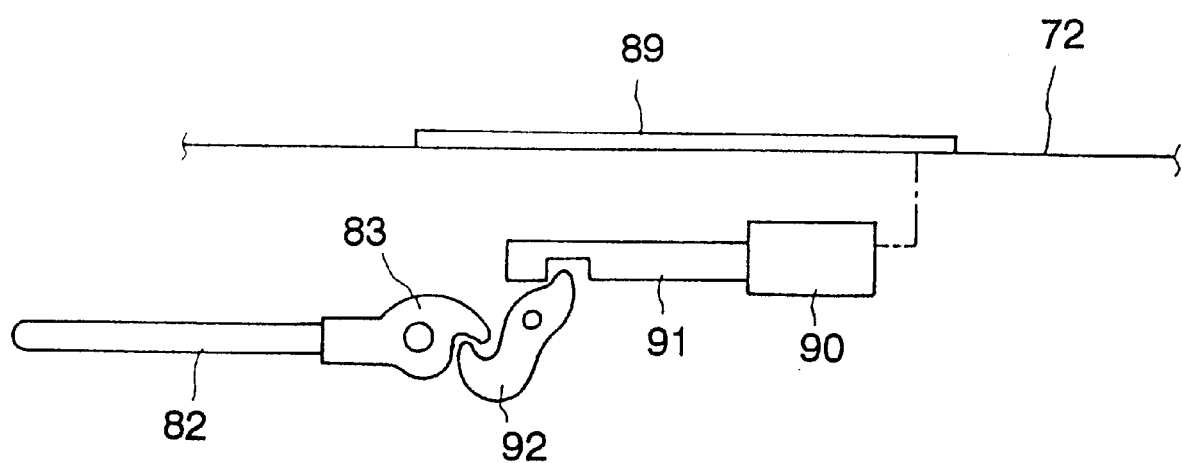
FIG. 24 is an explanatory illustration showing a cargo blocking device connected to a rear passenger seat in accordance with another embodiment of the invention.

The electrically actuated cargo blocking frame raising mechanism shown in FIG. 23 may be employed in place of the headrest raising mechanism of the rear passenger seat shown in FIGS. 18 through 22. Specifically, as shown in FIG. 24, the raiser plate 78, raiser arm 79 and connection rod 88 of the headrest raising mechanism of the rear seat are replaced with a cargo pressure sensor plate 89, a solenoid actuator 90 and a plunger 91, respectively. As was previously described with respect to the rear seat shown in FIG. 23, when the cargo pressure sensor plate 89 is loaded with cargo thereon, the solenoid actuator 90 is energized to protrude the plunger 91, bringing the latch arm 92 out of engagement with the hook plate 93. As a result, the headrest support frame 82 turns and raises up. When the cargo is removed from the cargo pressure sensor plate 89, the solenoid actuator 90 retracts the plunger 91, bringing the latch arm 92 into the engaging position. When the headrest support frame 82 is then manually moved down to the rest position, the hook plate 83 is brought into engagement with the latch arm 81 and holds the cargo blocking frame 67 in the collapsed position.

Figure 25:
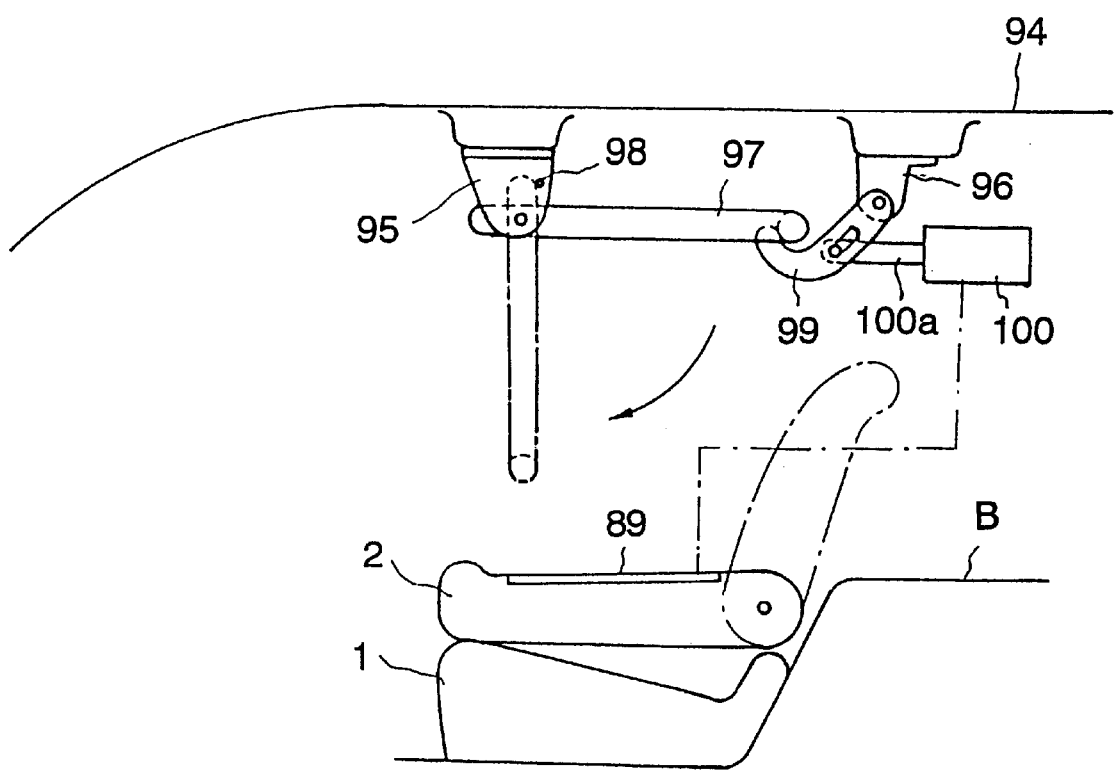
FIG. 25 is an explanatory illustration showing a cargo blocking device connected to a rear passenger seat in accordance with another embodiment of the invention.

FIG. 25 shows a cargo blocking device related to a rear passenger seat in accordance with another embodiment of the invention. The rear seat comprises a seat cushion 1 and a foldaway backrest 2 provided with a cargo sensor plate 89, such as a pressure sensor plate. A generally U-shaped cargo blocking frame 97 is suspended for pivotal movement from brackets 98 secured to a ceiling panel 94. The cargo blocking frame 97 is held in its horizontal rest position with its crossbar section engaged by a hook arm 99 pivotally supported by a bracket 96 secured to the ceiling panel 94. This hook arm 99 is linked to a plunger 100a of a solenoid actuator 100 secured to a wall of a vehicle body B.

When the cargo pressure sensor plate 89 is loaded with a cargo thereon, it generates and sends a signal to the solenoid actuator 100. The solenoid actuator 100 is energized with a signal from the cargo pressure sensor plate 89 to protrude the plunger 100a, turning the latch arm 99 in a counterclockwise direction to bring it out of engagement with the cargo blocking frame 97. As a result, the cargo blocking frame 97 turns downward until it is restricted by a stopper 98 extending laterally from the bracket 95 as shown by a chained line. When the cargo is removed from the cargo pressure sensor plate 89 and the signal disappears, the solenoid actuator 100 retracts the plunger 100a, bringing the latch arm 99 into a position engageable with the cargo blocking frame 97. Thereafter, when the cargo blocking frame 97 is manually moved up to the horizontal rest position, it is engaged by the latch arm 99 and held in the horizontal rest position. It is desirable to incorporate a damper in order to prevent the cargo blocking frame 97 from quickly turning downward when the cargo blocking frame 97 is released from the latch arm 99.

The cargo sensor 89 may be replaced with an electric sensor for detecting forward and downward movement of the foldaway backrest 2 and generating a signal to the solenoid actuator 100.

Figure 26A:
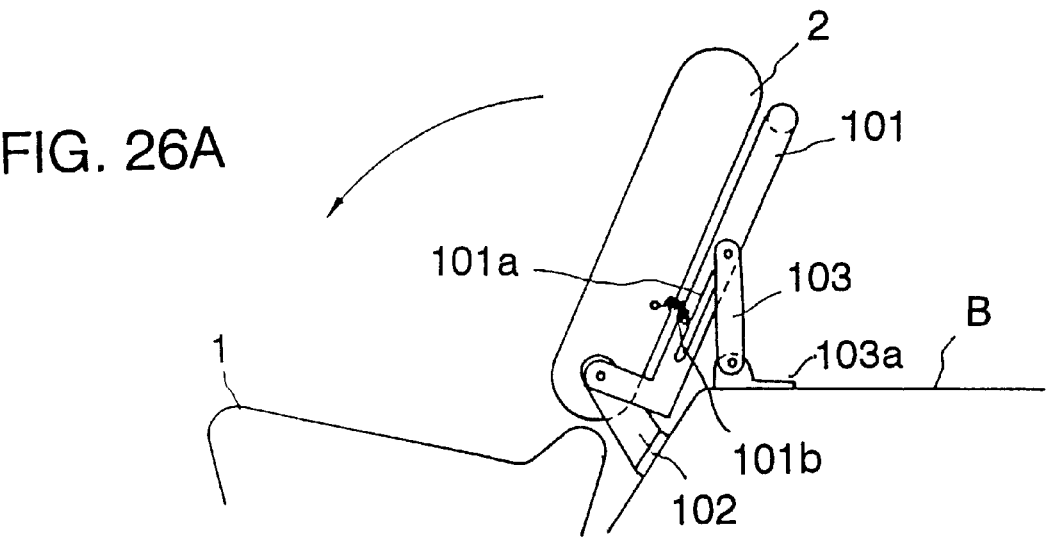
FIGS. 26A and 26B are side views of a cargo blocking device connected to a rear passenger seat in accordance with another embodiment of the invention.
Figure 26B:
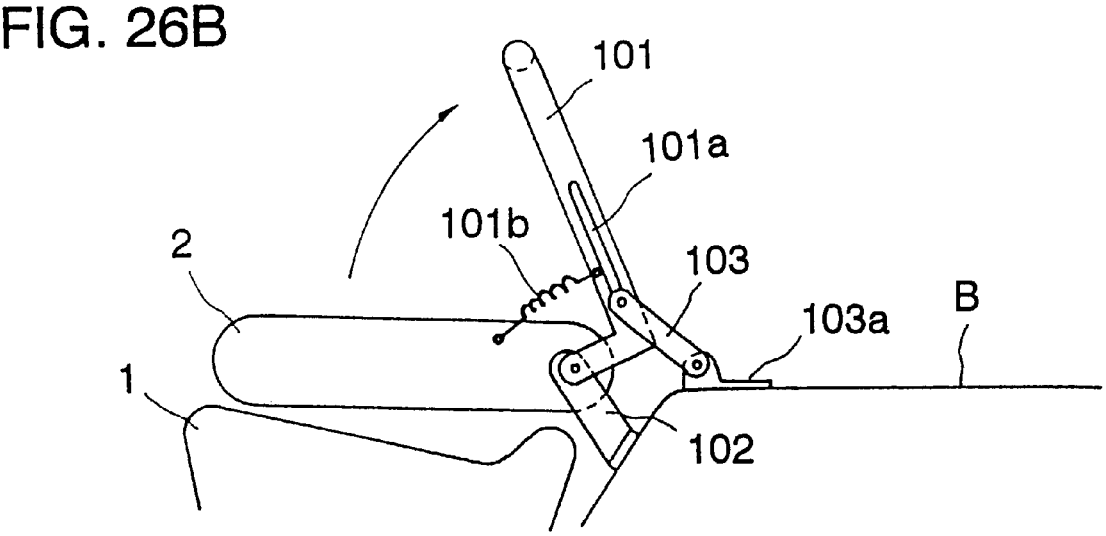

FIGS. 26A and 26B show a cargo blocking device connected to a rear passenger seat in accordance with another embodiment of the invention. The rear seat comprises a seat cushion 1 on a floor of the vehicle body B and a foldaway backrest 2 pivotally mounted at opposite sides on side hinges 102 that are secured to the floor of the vehicle body B. On the back of the foldaway backrest 2 is a generally U-shaped cargo blocking frame 101 pivotally mounted on the side hinges 102. The cargo blocking frame 101 is propped by a propping rod 103 pivotally mounted on a bracket 103a secured to the vehicle body B. This propping rod 103 at its top end is received for sliding movement in a slot 101a formed in a post section of the cargo blocking frame 101. Between the foldaway backrest 2 and the cargo blocking frame 101 there is a traction spring 101b for drawing the cargo blocking frame 101 toward the back of the foldaway backrest 2.

As the foldaway backrest 2 is turned downward, the cargo blocking frame 101 is drawn by the foldaway backrest 2 expanding the traction spring 101b. When the top of the propping rod 103 reaches the bottom of the slot 101a, the propping rod 103 is prevented from following the foldaway backrest 2. After that, the foldaway backrest 2 can be further turned down to its rest position and leaves the cargo blocking frame 101 as shown in FIG. 26B. On the other hand, when the foldaway backrest 2 is turned upward to its upright position, it pushes back the cargo blocking frame 101 to the position as shown in FIG. 26A.

Figure 27:
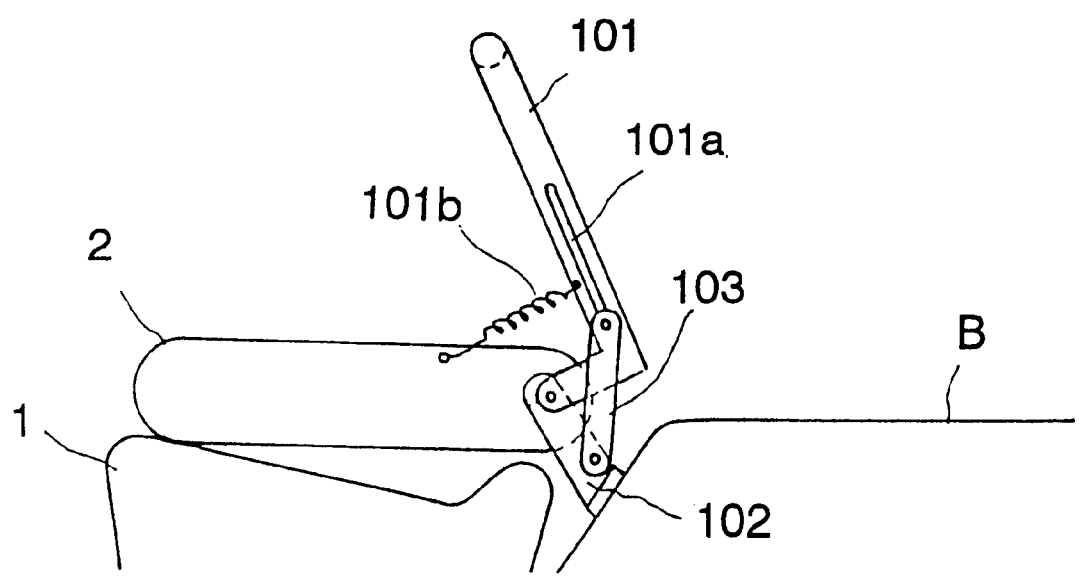
FIG. 27 is a side view of a variation of the cargo blocking device shown in FIGS. 26A and 26B.

The propping rod 103 may also be pivotally supported by the side hinge 102 as shown in FIG. 27.

Figure 28A:
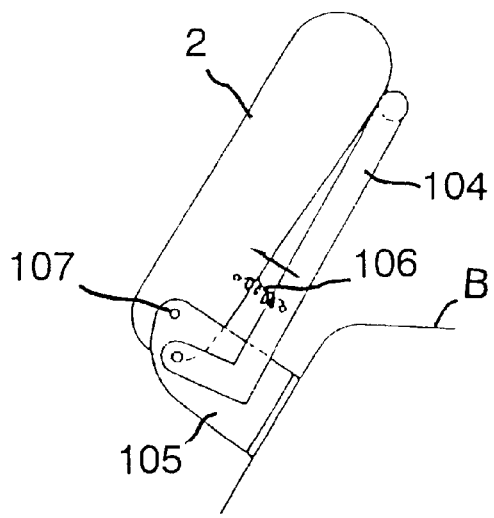
FIGS. 28A and 28B are schematic illustrations showing a cargo blocking device connected to a rear passenger seat in accordance with another embodiment of the invention.
Figure 28B:
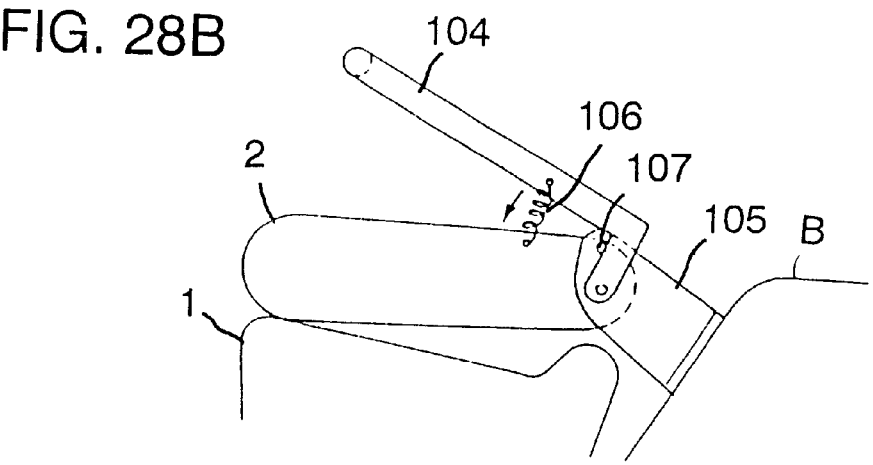
Figure 28C:
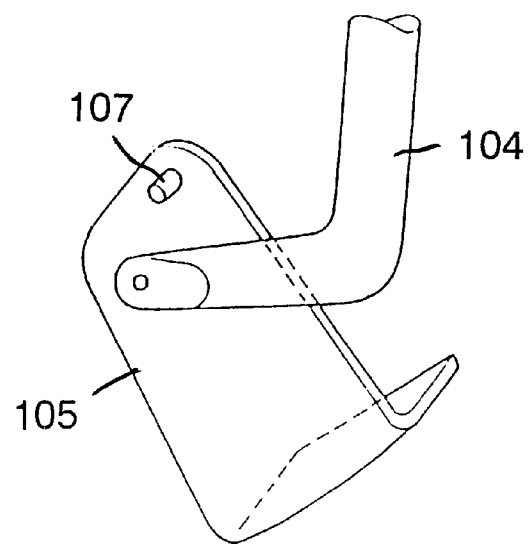
FIG. 28C is a perspective illustration showing a side hinge of the backrest.

FIGS. 28A through 28C show a cargo blocking device connected to a rear passenger seat in accordance with another embodiment of the invention. The rear seat comprises a seat cushion 1 put on a floor of the vehicle body B and a foldaway backrest 2 pivotally mounted at opposite sides on side hinges 105 secured to the floor of the vehicle body B. The foldaway backrest 2 at its back is provided with a generally U-shaped cargo blocking frame 104 pivotally mounted on the side hinges 105. The foldaway backrest 2 and the cargo blocking frame 104 are connected by a traction spring 106 for drawing the cargo blocking frame 104 when the foldaway backrest 2 is turned downward. The side hinge 105 is provided with a laterally extending stopper pin 107 as shown in FIG. 28C.

As the foldaway backrest 2 is turned downward, the cargo blocking frame 104 is drawn by the foldaway backrest 2 through the traction spring 106 until it is stopped by the stopper pin 107 as shown in FIG. 28B.

Figure 29A:
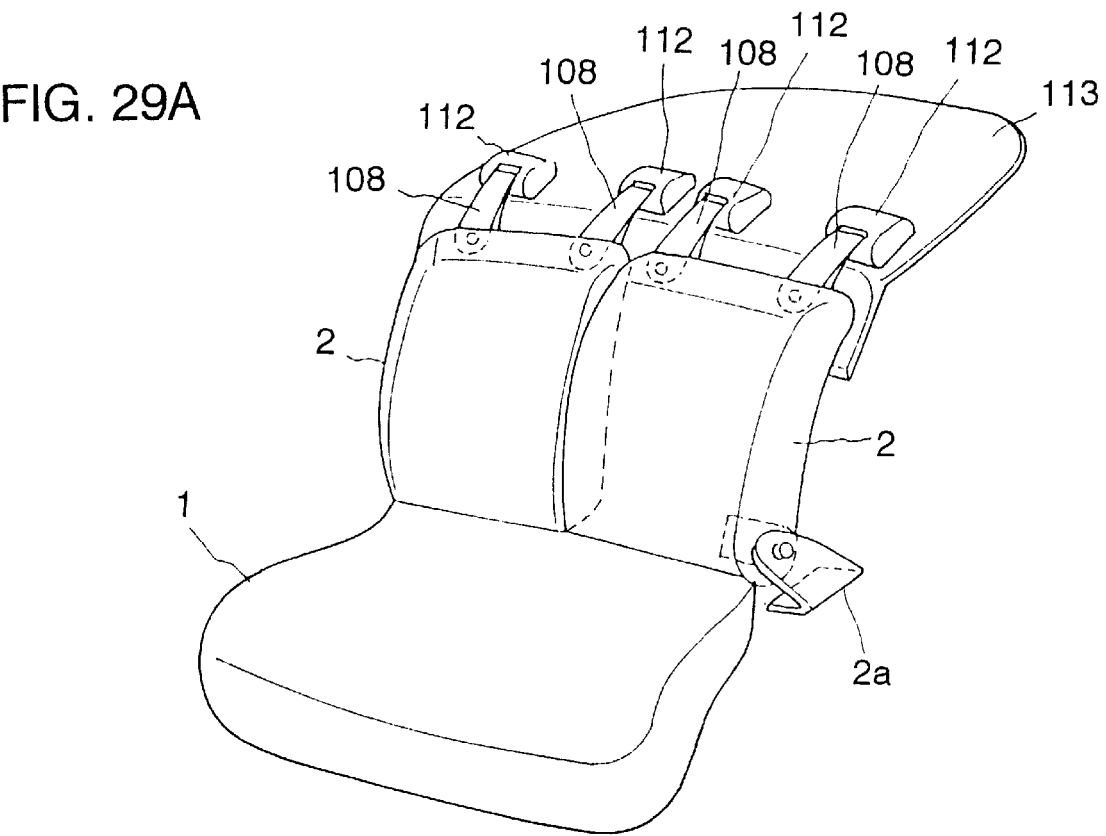
FIG. 29A is a perspective view of a cargo blocking device related to a rear passenger seat in accordance with another embodiment of the invention.
Figure 29B:
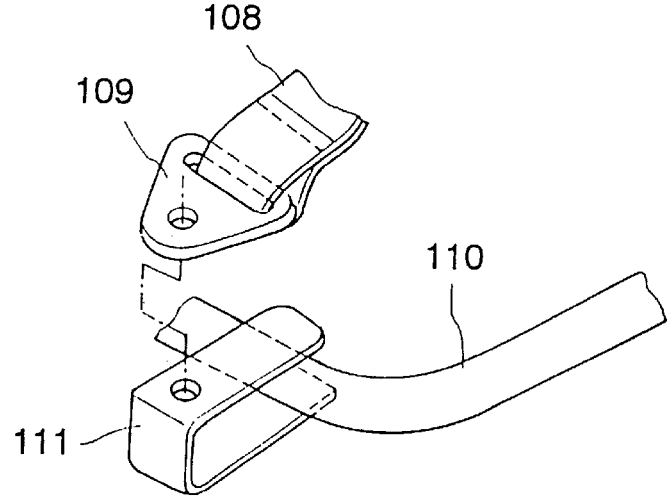
FIG. 29B is an exploded perspective illustration showing connection of a cargo blocking belt to the backrest.

FIGS. 29A and 29B show a cargo blocking device connected to a rear passenger seat in accordance with another embodiment of the invention. The rear seat comprises a seat cushion 1 for two passengers and is placed on a floor of the vehicle body B. The rear seat includes two foldaway backrests 2 arranged side by side. Each foldaway backrest 2 has an air pipe 110 inside thereof and is pivotally mounted at opposite sides on side hinges 2a secured to the floor of the vehicle body B. A retractable type of cargo blocking belts 108 are installed between the backrests 2 and a rear package panel 113 extending between the rear seat and the rear windshield (not shown). Specifically, each cargo blocking belt 108 at one end is connected to the air pipe 110 by means of a swivel 109. The swivel 109 is pivoted to a bracket 111 welded to the air pipe 110. The cargo blocking belt 108 at another end is connected to a winder 112 of a type which allows the cargo blocking belt 108 to be drawn out following downward movement of the foldaway backrest 2 toward its rest position. The winder 112 locks in response to a specified level of tension applied to the cargo blocking belt 108 by the cargo.

The blocking belts 108 are retracted from the winders 112 following downward movement of the foldaway backrest 2 toward the rest position and extend over the back of the backrest 2 in the rest position. When the cargo located on the back of the backrest 2 slides forward and applies a tension greater than the specified level to the cargo blocking belts 108, the winders 112 lock the cargo blocking belts 108 and tighten them. As a result, the cargo is pressed down by the cargo blocking belts 108 and is prevented from moving further forward.

Figure 30A:
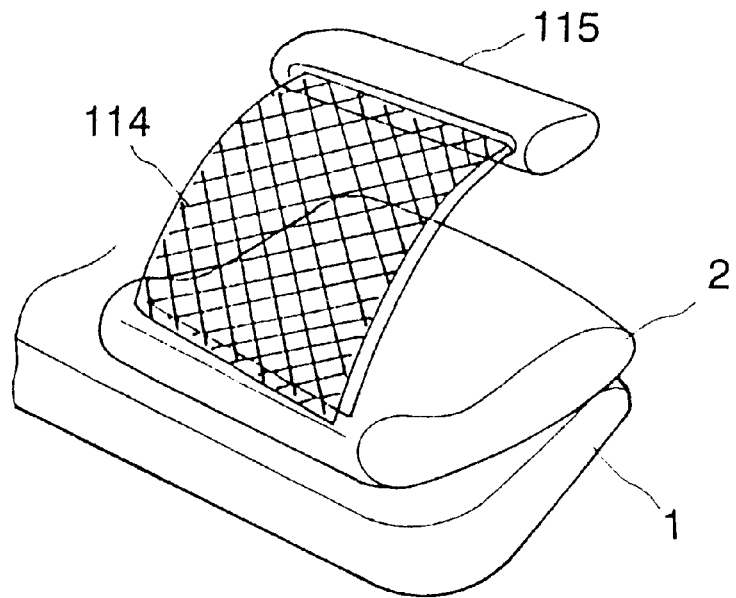
FIG. 30A is a perspective view of a cargo blocking device connected to a rear passenger seat in accordance with another embodiment of the invention.
Figure 30B:
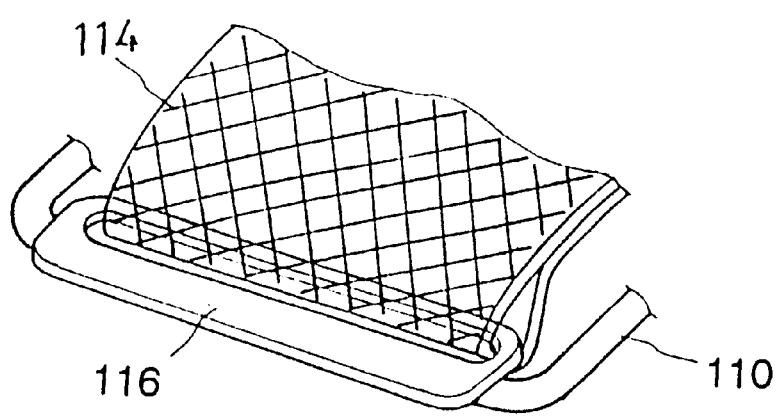
FIG. 30B is a perspective illustration showing connection of a cargo blocking net to the backrest.

The cargo blocking belts 108 shown in FIG. 29A may be replaced with a retractable cargo blocking net 114 as shown in FIG. 30. This cargo blocking net 114 is connected to the foldaway backrest 2 by means of a connecting plate 116. A winder 115 is installed on a rear package panel 113 (see FIG. 29A) to wind up the cargo blocking net 114 when the backrest 2 is moved upward.

Figure 31:
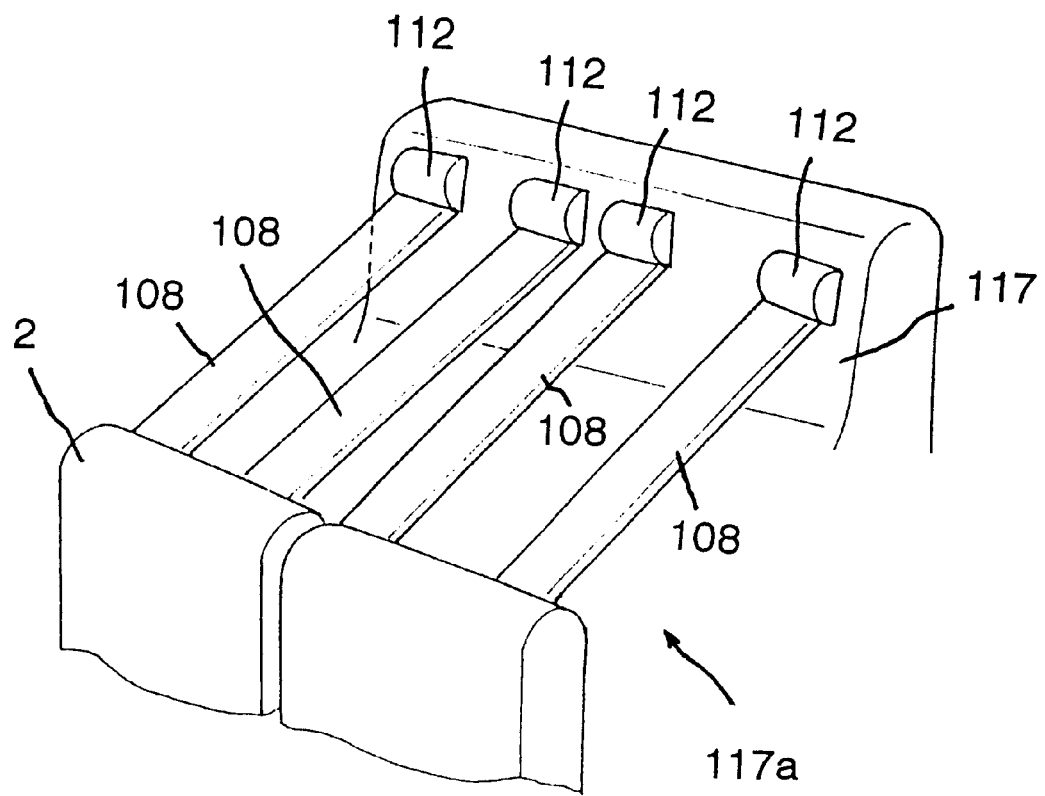
FIG. 31 is a perspective illustration showing a cargo blocking device connected to a rear passenger seat in accordance with another embodiment of the invention.

FIG. 31 shows a cargo blocking device connected to a rear passenger seat in accordance with another embodiment of the invention which is suitably installed in station wagons. Retractable cargo blocking belts 108 are provided to stretch over a cargo space 117a provided between the foldaway backrests 2 and a rift gate 117. Each cargo blocking belt 108 is secured at one end to the backrest 2 and at another end is retractably connected to a winder 112 secured to the rift gate 117. When the backrest 2 is turned down to its rest position, the blocking belts 108 are retracted from the winders 112 and press down on the cargo placed in the cargo space. The cargo blocking belts 108 may also be replaced with a cargo blocking net.

Figure 32A:
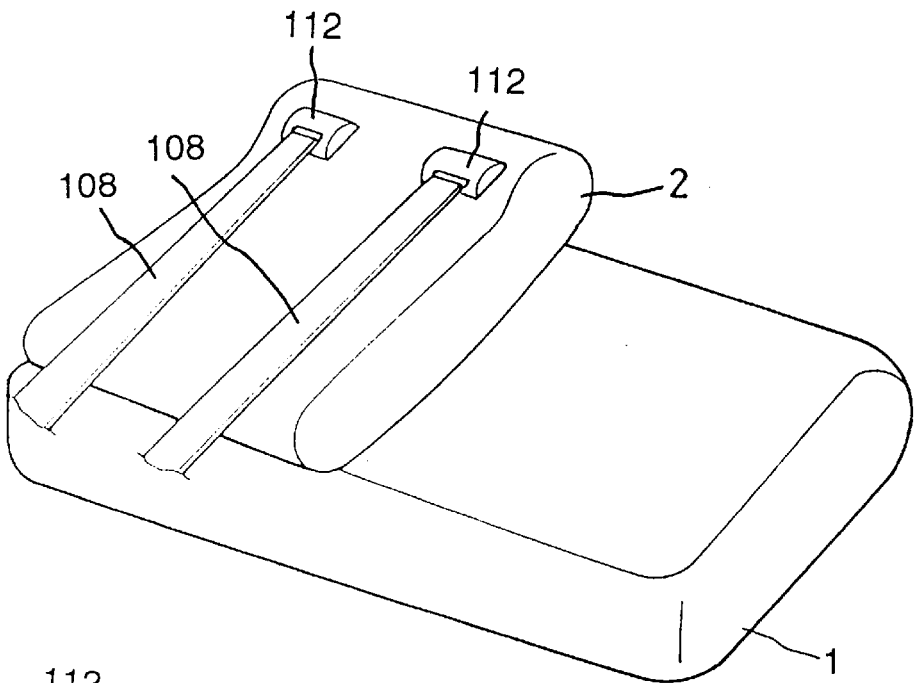
FIG. 32A is a perspective illustration showing a cargo blocking device installed to a rear passenger seat in accordance with another embodiment of the invention.
Figure 32B:
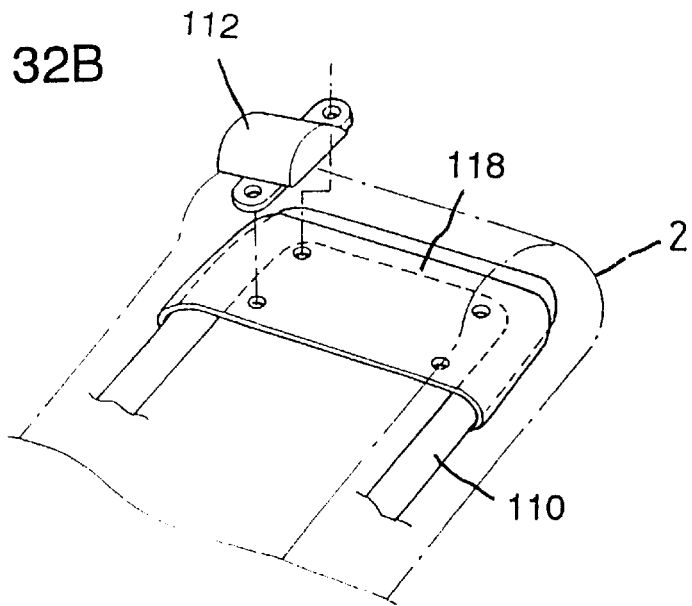
FIG. 32B is an perspective illustration showing connection of a cargo blocking belt to the backrest.

Alternatively, as shown in FIGS. 32A and 32B, the winders 112 may be secured to a fixing plate 118 which is attached to an air pipe 110 of the foldaway backrests 2.

Figure 33A:
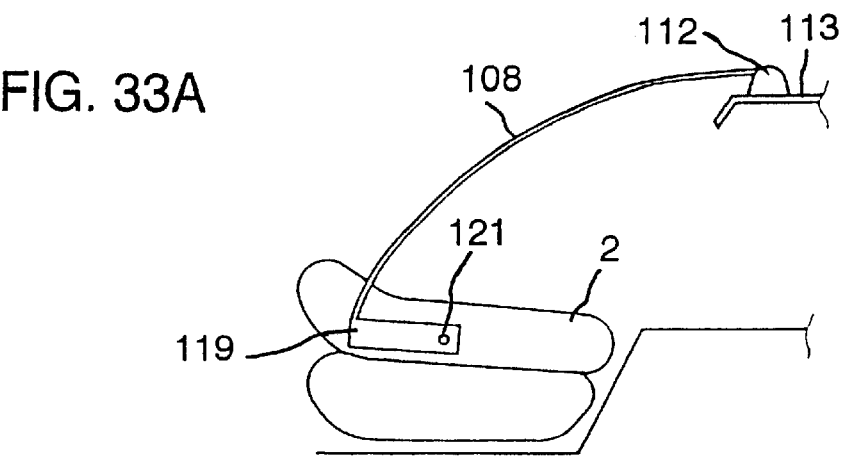
FIG. 33A is a schematic side view of a cargo blocking device installed to a rear passenger seat in accordance with another embodiment of the invention.
Figure 33B:
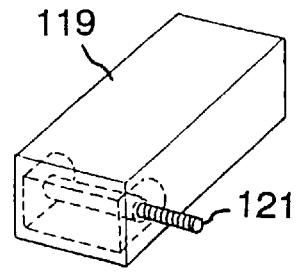
FIG. 33B is a perspective view of a box-shaped connecting arm of the cargo blocking device shown in FIG. 33A.
Figure 33C:
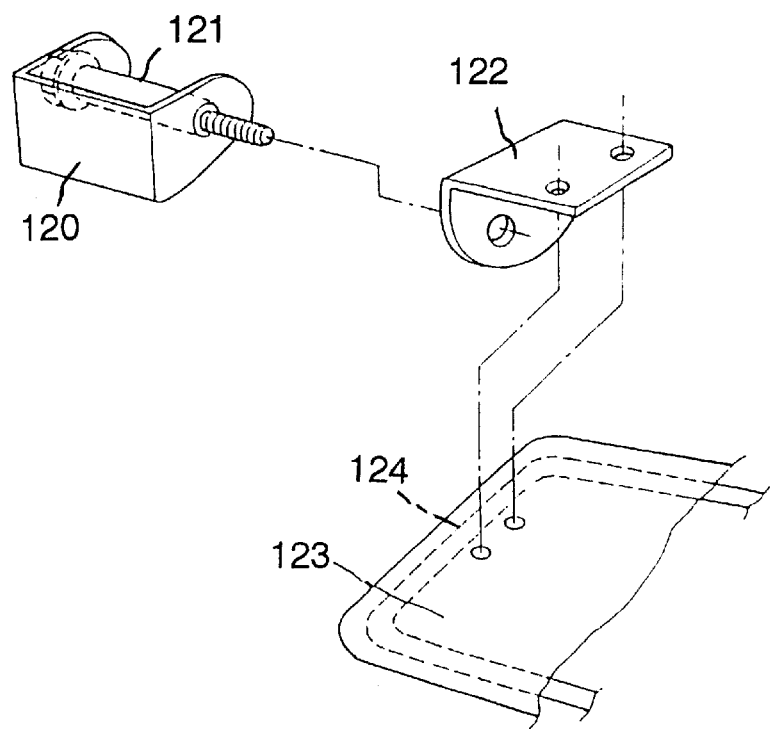
FIG. 33C is an illustration showing connection of the exploded perspective view of a box-shaped connecting arm of the cargo blocking device to a backrest of the rear passenger seat.

FIGS. 33A through 33C show a cargo blocking device connected to a rear passenger seat in accordance with another embodiment of the invention. Each belt 108 has such a specified length that it is somewhat slackened when fully extended. The cargo blocking belt 108 is connected at one end to a winder 112 secured to a rear package panel 113 and at another end to a side bracket 122 secured to one side of a backrest 2 by means of a box-shaped connecting arm 119. As shown in detail in FIGS. 33B and 33C, the side bracket 122 is bolted to a fixing plate 123 which is attached to an air pipe 124 of the foldaway backrests 2. The connecting arm 119 includes a bracket 120 fixed therein for pivotally supporting a shouldered bolt 121. The bracket 120 is fastened to the side bracket 122 by the shouldered bolt 121.

When cargo blocking belt 108 is fully stretched between the rear package panel 113 and the backrest 2 it is slightly slackened as shown in FIG. 33A and prevents cargo located on the back of the backrest 2 from moving forward.

FIG. 34A shows a cargo blocking device connected to a rear passenger seat in accordance with another embodiment of the invention. As shown in FIG. 26A, a foldaway backrest 2, which is collapsible over a seat cushion 1, is provided with an air pipe 125 embedded therein. The air pipe 125 has a cargo blocking pipe section 125a projecting out of the top of the backrest 2 and extends backward. This cargo blocking pipe section 125a may be formed integrally with or provided separately from the air pipe 125.

As shown in FIG. 34B, in cases where an air pipe 126 is formed integrally with a cargo blocking pipe section 126a, the backrest 2 is formed with a bulge section 2b at the top thereof for embedding the cargo blocking pipe section 126a therein.

Alternatively, a cargo blocking pipe section may be formed as a part of a head rest strut. As shown in FIG. 34C, a headrest strut 128 is formed integrally with a cargo blocking pipe section 128a and extends backward at an approximately right angle therefrom. The cargo blocking pipe section 128a is embedded in a bulged headrest 127.

Figure 35C:
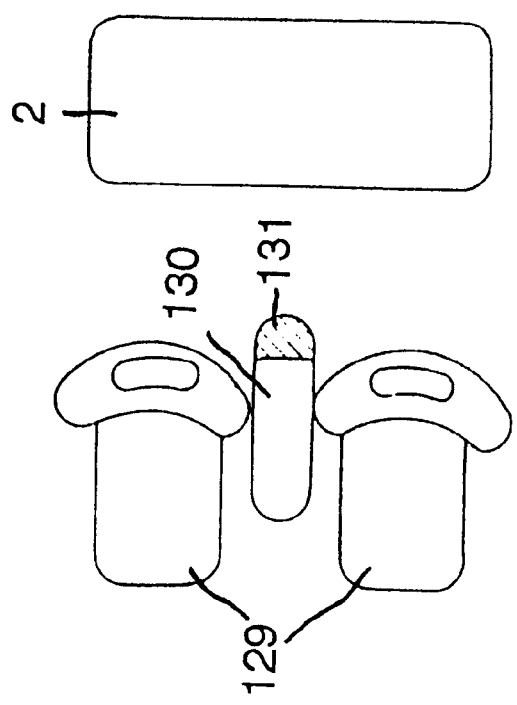
FIG. 35C is a schematic plan view of a variation of the cargo blocking device shown in FIGS. 35A and 35B.
Figure 35A:
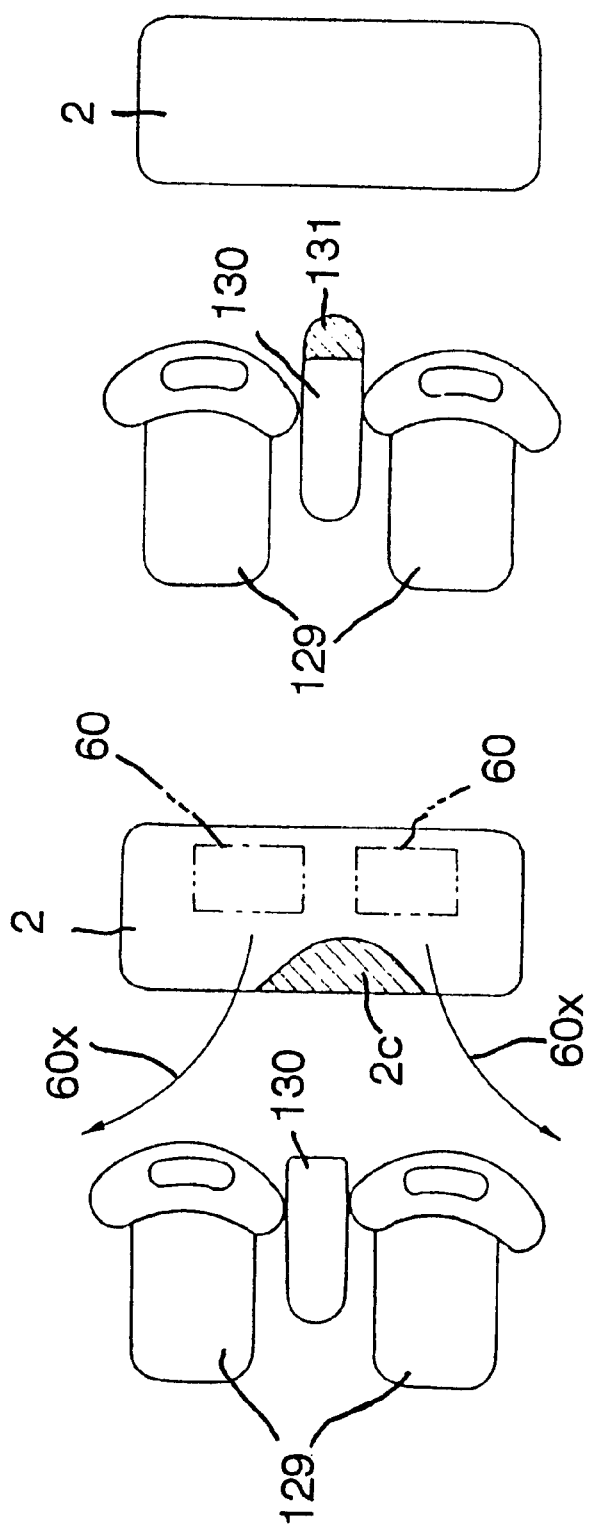
FIG. 35A is a schematic plan view of a cargo blocking device installed to a rear passenger seat in accordance with another embodiment of the invention.
Figure 35B:
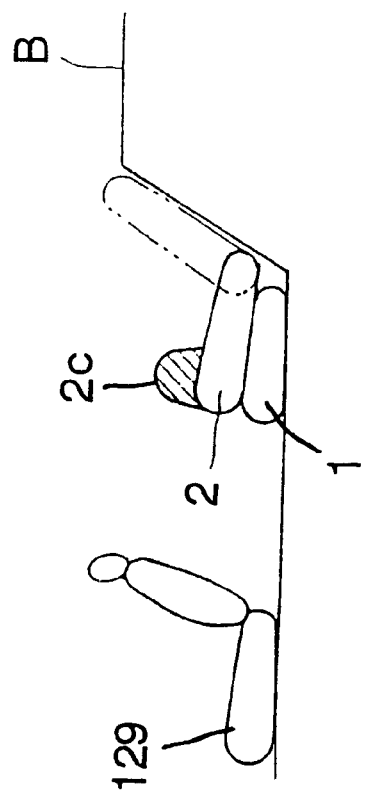
FIG. 35B is a schematic side view of the cargo blocking device shown in FIG. 35A.

FIGS. 35A and 35B show a cargo blocking device formed integrally with a bench type of rear passenger seat in accordance with another embodiment of the invention. As shown, a rear bench seat comprises a seat cushion 1 and a foldaway backrest 2 located behind the front bucket seats 29 that are arranged side by side. A console 130 is placed between the front bucket seats 129. The backrest 2 is formed integrally with a diverting bulge 2c at the top center of the back thereof. The diverting bulge 2c is shaped such that cargo sliding on the back of the backrest 2 is diverted toward the side trim walls of the vehicle body B by the diverting bulge 2c as shown by arrows 60X in FIG. 35A in, for instance, the event of a front end collision or a sudden stop of the vehicle. As shown in FIG. 35C, in place of the diverting bulge 2c, a supplemental restraint air bag for rear passengers may be installed to the console 131 so as to divert the cargo on the back of the backrest 2 toward side trim walls of the vehicle body B.

Figure 36A:
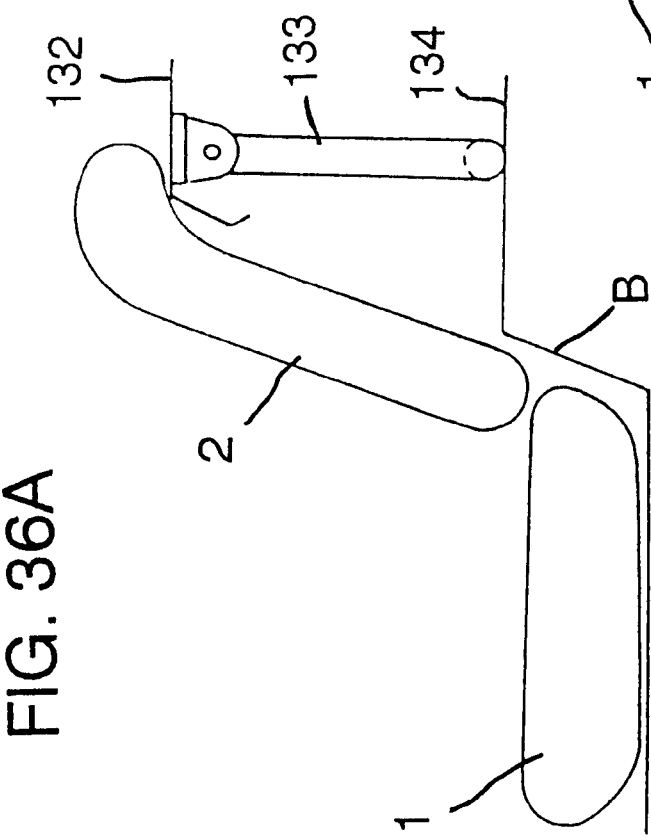
FIG. 36A is a schematic side view of a cargo blocking device installed behind a rear passenger seat in accordance with another embodiment of the invention.
Figure 36B:
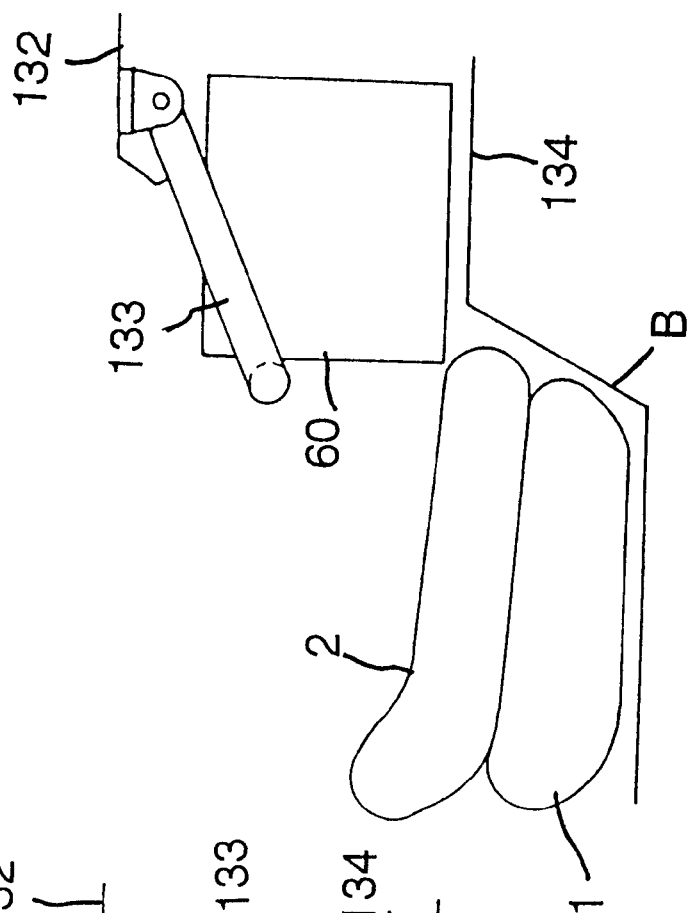
FIG. 36B is a schematic side view of the cargo blocking device shown in FIG. 36A in a state where a cargo blocking frame catches the cargo.

FIGS. 36A and 36B show a cargo blocking device related to a rear passenger seat in accordance with an embodiment of the invention. The rear seat comprises a seat cushion 1 and a backrest 2. A generally U-shaped blocking frame 133 is suspended from a rear package panel 132 behind the backrest 2 and extends toward the floor 134 of the vehicle body B. When the backrest 2 is turned down, the blocking frame 133 catches the cargo 60 sliding on the floor 134 toward the backrest 2 in, for instance, the event of a front end collision or a sudden stop of the vehicle.

Figures 37A, 37B:
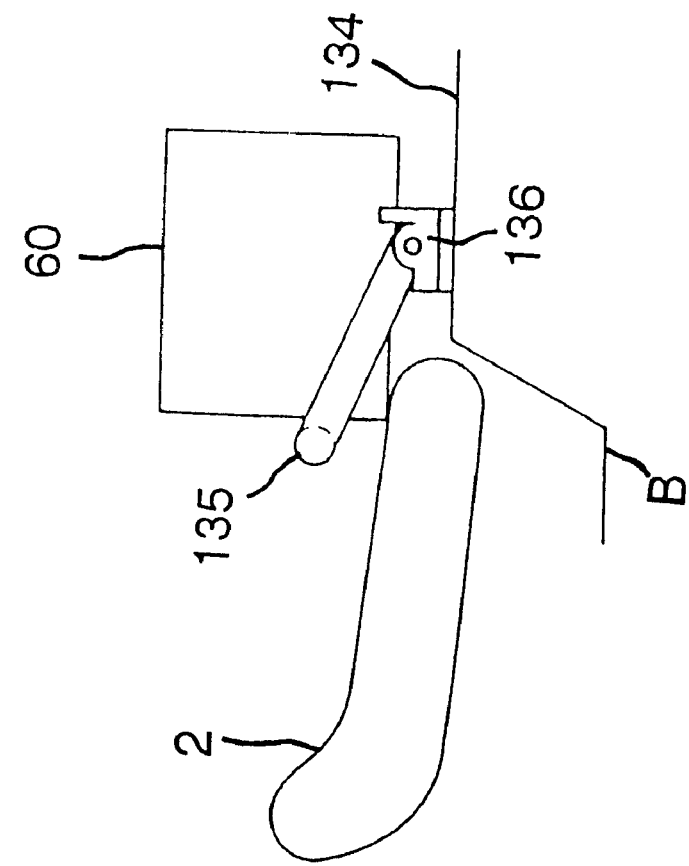
FIG. 37A is a schematic side view of a variation of the cargo blocking device shown in FIG. 36A.
FIG. 37B is a schematic side view of the cargo blocking device shown in FIG. 37A in a state where a cargo blocking frame catches the cargo.

The blocking frame may be installed to a floor of the vehicle body as shown in FIGS. 37A and 37B. A generally U-shaped blocking frame 135 is pivotally mounted on a bracket 136 secured to the floor 134 behind a backrest 2 and extends near a rear package panel 132. The bracket 136 has a function to restrict forward rotation of the blocking frame 135 to a certain angle less than a right angle and backward rotation to an upright position. Similar to the blocking frame 133 of the previous embodiment, while the backrest 2 is turned down, the blocking frame 135 catches the cargo 60 sliding on the floor 134 toward the backrest 2 in, for instance, the event of a front end collision or a sudden stop of the vehicle.

Figure 38A:
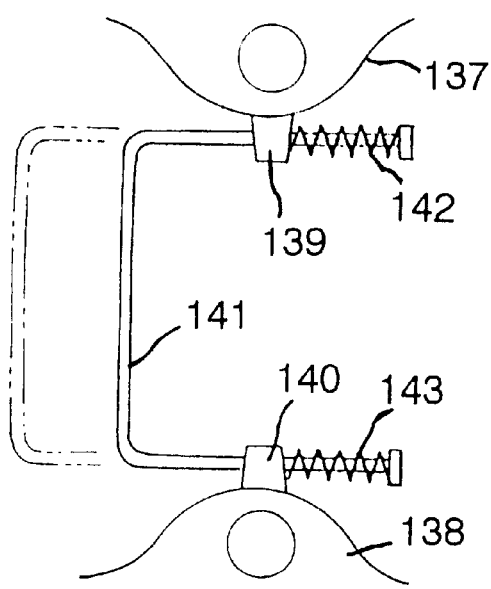
FIG. 38A is a plan view of a cargo blocking device connected to rear suspension tours in accordance with another embodiment of the invention.
Figure 38B:
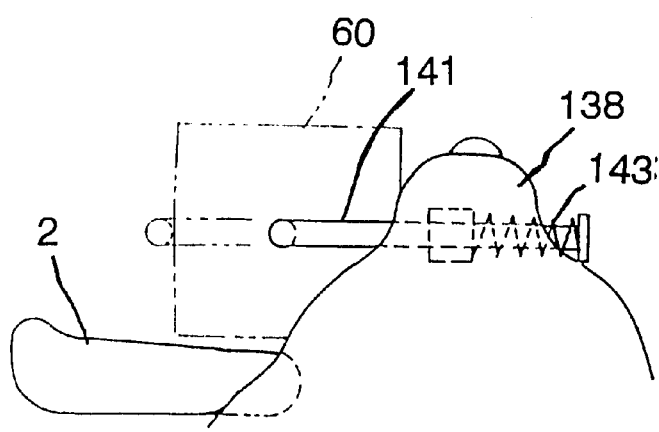
FIG. 38B is a schematic side view of the cargo blocking device shown in FIG. 38A in a state where a cargo blocking frame catches the cargo.

FIGS. 38A and 38B show a cargo blocking device connected to rear suspension tours in accordance with another embodiment of the invention. Behind a foldaway backrest 2, there is provided a generally U-shaped cargo blocking frame 141 which is supported for sliding movement by brackets 139 and 140 pivotally mounted to rear suspension tours 137 and 138, respectively. Return springs 142 and 143 are mounted between post sections of the cargo blocking frame 141 and the brackets 139 and 140, respectively, to retract the cargo blocking frame 141 backward. Each bracket 139, 140 is provided with a stopper (not shown) to prevent the cargo blocking frame 141 from turning down below a horizontal position as shown in FIG. 38B.

When the cargo 60 located on the floor of the vehicle slides toward the backrest 2 in the rest position, it is caught by the cargo blocking frame and prevented from moving further forward.

Figure 39:
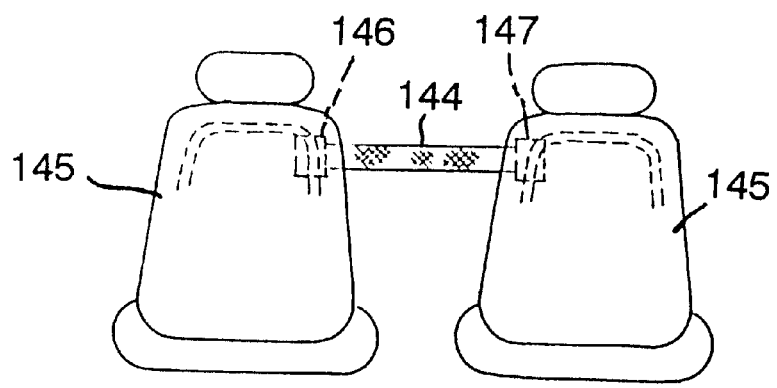
FIG. 39 is a front view of a cargo blocking device related to front passenger seats in accordance with an embodiment of the invention.

FIG. 39 shows cargo blocking device connected to a pair of front bucket seats in accordance with another embodiment of the invention. Retractable webbing 144 is stretched between the backrest of the front bucket seats 145 arranged side by side. The webbing 144 is connected at one end to a buffer 147 embedded in the backrest of either one of the front seat 145 and the other end is connected to a winder 146 embedded in the backrest of the other front seat 145. In, for instance, the event of a front end collision or a sudden stop, the webbing 144 catches the cargo moving toward a front compartment of the vehicle and absorbs the energy of an impact before the cargo reaches the passengers on the front seats 145.

Figure 40:
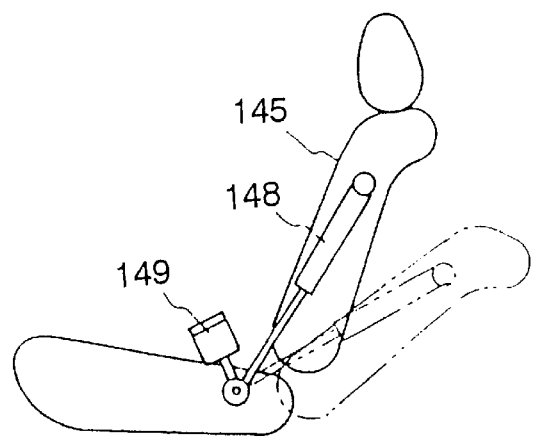
FIG. 40 is a schematic illustration of a cargo blocking device connected to a rear passenger seat in accordance with the invention.

FIG. 40 shows a cargo blocking device connected to a front bucket seat in accordance with still another embodiment of the invention. The front seat comprises a seat cushion 1 and a reclining backrest 2 between which an expandable staying damper 148 is provided. The staying damper 148 at its one end is connected to the seat cushion together with a seat belt anchor 149. The staying damper 148 expands and contracts following backward and forward pivotal movement of the backrest 2. In the event of a collision or a sudden stop, the staying damper 148 absorbs the energy of an impact applied to the backrest 2.

Figure 41A:
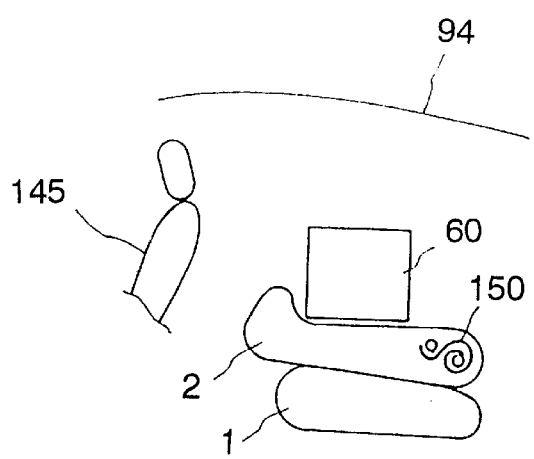
FIGS. 41A and 41B are schematic illustrations for explaining operation of the backrest as a cargo blocking device in accordance with a further embodiment of the invention.
Figure 41B:
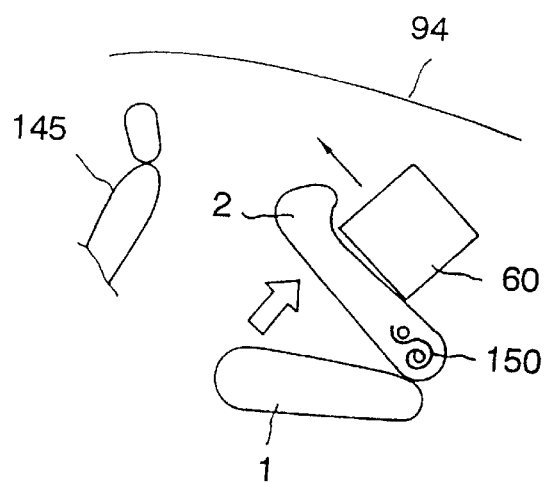
Figure 41C:
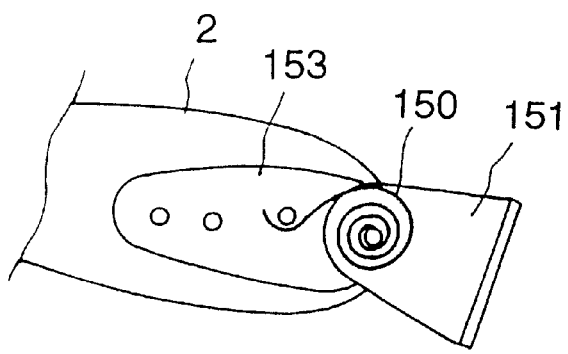
FIGS. 41C and 41D are side views of a side hinge of the backrest shown in FIGS. 41A and 41B.
Figure 41D:
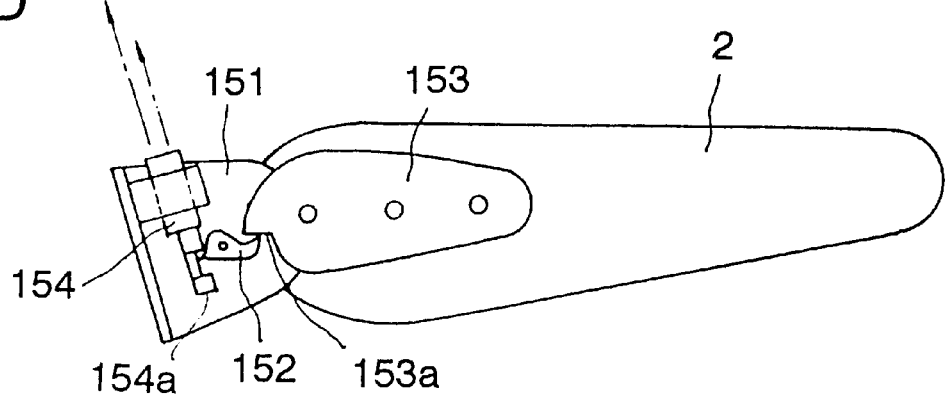

FIGS. 41A through 41D show a cargo blocking device related to a rear passenger seat in accordance with a further embodiment of the invention. The rear seat comprises a seat cushion 1 and a spring-back type of foldaway backrest 2. The backrest 2 in the rest position springs back to fling the cargo on the back of the backrest 2 toward the ceiling panel 94 of the vehicle in response to a collision as shown in FIG. 41B, thereby preventing the cargo from rushing into a front compartment. As shown in FIG. 41C, a torsion spring 150 is mounted between a hook plate 153 secured to one side of the backrest 2 and a side hinge 151 to which the backrest 2 is pivotally mounted. The side hinge 151, which is secured to a floor of the vehicle body (not shown), is provided with a latch arm 152 pivotally mounted thereon and a solenoid actuator 154 secured thereto which is energized in response to a signal for exploding a supplemental restraint air bag (not shown). When the solenoid actuator 154 is energized, it retracts a solenoid plunger 154a to turn the latch arm 152 in a counterclockwise direction as viewed in FIG. 41D.

When the backrest 2 is being turned down to its rest position charging the torsion spring 150 with torsional moment, the hook plate 153 is brought into engagement with the latch arm 154. As shown in FIG. 41A, a cargo can be placed on the back of the backrest 2 in the rest position. In the event of a collision, as soon as the supplemental restraint air bag explodes, the solenoid actuator 154 is energized to retract the plunger 154a, turning the latch arm 152 and disengaging it from the surface 153a of the hook plate 153. As a result, the backrest 2 is quickly driven back toward the upright position by the torsion spring 150 and flings the cargo on the back of the backrest 2 toward the ceiling panel 94 as shown in FIG. 41B, thereby preventing the cargo from moving into a front compartment.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A cargo blocking device for a vehicle for preventing cargo from moving forward beyond a rear passenger seat in an event that the cargo has a tendency to move forward, said cargo blocking device comprising:

a seat cushion having a front end pivotally hinged so that said seat cushion is movable between an approximately horizontal regular position and an upright rest position;

a bracket attached directly to a portion of a vehicle body;

a backrest having a lower end pivotally mounted to said bracket so as to be movable between an upright regular position and an approximately horizontal rest position; and backrest restraint means for restraining said backrest from moving down to said approximately horizontal rest position unless said seat cushion is in said upright rest position and for allowing said backrest to be moved down to said approximately horizontal rest position after said seat cushion has been moved to said upright rest position, thereby preventing the cargo from moving over said seat cushion in said upright rest position;

said backrest restraint means comprising:

a hook member secured to said backrest and pivotally mounted to said bracket secured to a stationary section of a vehicle body;

a latch member pivotally mounted to said bracket and able to be turned by said seat cushion; and, a return spring mounted between said bracket and said latch member to force said latch member to be disengaged from said hook member, said latch member being turned by said seat cushion to be brought into engagement with said hook member while said seat cushion is being moved toward said approximately horizontal regular position.

2. A cargo blocking device for a vehicle for preventing cargo from moving forward beyond a rear passenger seat in an event that the cargo has a tendency to move forward, said cargo blocking device comprising:

a seat cushion having a front end pivotally hinged so that said seat cushion is movable between an approximately horizontal regular position and an upright rest position;

a bracket attached directly to a portion of a vehicle body;

a backrest having a lower end pivotally mounted to said bracket so as to be movable between an upright regular position and an approximately horizontal rest position; and backrest restraint means for restraining said backrest from moving down to said approximately horizontal rest position unless said seat cushion is in said upright rest position and for allowing said backrest to be moved down to said approximately horizontal rest position after said seat cushion has been moved to said upright rest position, thereby preventing the cargo from moving over said seat cushion in said upright rest position;

said backrest restraint means comprising:

a hook member secured to said backrest;

a latch member pivotally mounted to a stationary section of a vehicle body, said latch member being brought into engagement with said hook member when said seat cushion is turned down to said approximately horizontal regular position after said backrest has been turned up to said upright regular position to restrain said backrest from being turned down to said approximately horizontal rest position and being brought out of engagement with said hook member when said seat cushion is turned up to said upright rest position thereby permitting said backrest to be turned down to said approximately horizontal rest position; and a return spring mounted between said stationary section and said latch member to bring said latch member out of engagement with said hook member; and wherein said latch member is also formed with an extension lever by means of which said latch member is operationally connected to said seat cushion such that when said seat cushion pushes down on said extension lever against said return spring, said latch member is brought into engagement with said hook member.

\* \* \* \* \*